United States Patent
Peterson et al.

(10) Patent No.: US 10,534,533 B2
(45) Date of Patent: Jan. 14, 2020

(54) MESSAGING STICKER APPLICATIONS

(71) Applicant: Apple Inc., Cupertino, CA (US)

(72) Inventors: Adele C. Peterson, Los Gatos, CA (US); Bhaskar P. Sarma, Santa Clara, CA (US); Kevin J. Lindeman, Morgan Hill, CA (US); Roberto Garcia, Santa Clara, CA (US); David Alex Carter, San Francisco, CA (US); Gokul Thirumala, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 426 days.

(21) Appl. No.: 15/389,219

(22) Filed: Dec. 22, 2016

(65) Prior Publication Data

US 2017/0357415 A1    Dec. 14, 2017

Related U.S. Application Data

(60) Provisional application No. 62/349,113, filed on Jun. 12, 2016, provisional application No. 62/349,101, (Continued)

(51) Int. Cl.
*G06F 3/0484* (2013.01)
*G06F 3/0482* (2013.01)
(Continued)

(52) U.S. Cl.
CPC ........ *G06F 3/04886* (2013.01); *G06F 3/0482* (2013.01); *G06F 3/0486* (2013.01);
(Continued)

(58) Field of Classification Search
CPC .............. G06F 3/04886; G06F 3/0482; G06F 3/04842; G06F 3/04845; G06F 3/0486;
(Continued)

(56) References Cited

U.S. PATENT DOCUMENTS 7,669,134 B1    2/2010    Christie et al.
7,814,425 B1    10/2010   O'Shaugnessy
(Continued)

FOREIGN PATENT DOCUMENTS

WO    WO 2015/162072 A2    10/2015
WO    WO 2015/183456 A1    12/2015

OTHER PUBLICATIONS

Complete Guide—Messenger Platform—Technical Implementation, downloaded May 27, 2016, https://developers.facebook.com/docs/messenger-platform/implementation, 18 pages.
(Continued)

*Primary Examiner* — Lynn D Feild
*Assistant Examiner* — Jessica J South
(74) *Attorney, Agent, or Firm* — Morgan, Lewis & Bockius LLP

(57) ABSTRACT

A messaging system in one embodiment includes a messaging app and one or more sticker extension apps configured to create a sticker image and render a sticker image that is displayed in a view hosted by the messaging app. The messaging app can launch, from a browsable view that includes one or more sticker extension apps, one or more of the sticker extension apps, and a sticker image created by one of the sticker extension apps can be communicated between the sticker extension app and the messaging app through an interprocess communication.

20 Claims, 30 Drawing Sheets

Related U.S. Application Data filed on Jun. 12, 2016, provisional application No. 62/349,091, filed on Jun. 12, 2016.

(51) Int. Cl.

| | | |
|---|---|---|
| *H04L 12/58* | (2006.01) | |
| *G06F 3/0486* | (2013.01) | |
| *G06F 3/0488* | (2013.01) | |
| *G06F 9/54* | (2006.01) | |
| *H04W 4/14* | (2009.01) | |

(52) U.S. Cl.
CPC ...... *G06F 3/04842* (2013.01); *G06F 3/04845* (2013.01); *G06F 9/54* (2013.01); *H04L 51/046* (2013.01); *H04L 51/063* (2013.01); *H04L 51/10* (2013.01); *H04L 51/16* (2013.01); *H04L 51/18* (2013.01); *H04W 4/14* (2013.01); *G06F 2203/04803* (2013.01)

(58) Field of Classification Search
CPC ............. G06F 9/54; G06F 2203/04803; H04L 51/046; H04L 51/063; H04L 51/10; H04L 51/16; H04L 51/18; H04W 4/14
See application file for complete search history.

(56) References Cited

U.S. PATENT DOCUMENTS

| | | | | |
|---|---|---|---|---|
| 9,230,355 B1* | 1/2016 | Ahuja | ................... | G06T 11/60 |
| 2012/0185542 A1 | 7/2012 | Vyrros et al. | | |
| 2012/0296954 A1 | 11/2012 | Lyle | | |
| 2013/0247220 A1* | 9/2013 | Bingell | ............... | H04L 63/0428 726/28 |
| 2015/0154156 A1 | 6/2015 | Meyers, Jr. | | |
| 2015/0334067 A1* | 11/2015 | Zonka | ..................... | H04L 67/36 715/752 |
| 2015/0347748 A1 | 12/2015 | Krstic et al. | | |
| 2016/0283447 A1 | 9/2016 | Masterson | | |
| 2017/0230320 A1 | 8/2017 | Knight | | |
| 2017/0308545 A1 | 10/2017 | Soni | | |
| 2018/0060928 A1* | 3/2018 | Sadler | ................... | G06Q 20/20 |

OTHER PUBLICATIONS

Getting Started—Messenger Platform—downloaed May 27, 2016, http://developers.facebook.com/docs/messenger-platform/quickstart, 6 pages.

Google launches time-saving keyboard for iPhones, May 12, 2016, 2 pages.

Business Insider—Snapchat now lets you add fun stickers to photos and videos, May 23, 2016, 4 pages.

European Patent Application No. 17174969.0, Partial European Search Report dated Jul. 26, 2017, 13 pages.

PCT International Search Report and Written Opinion for International Application No. PCT/US2017/034340, dated Jul. 19, 2017, 10 pages.

* cited by examiner

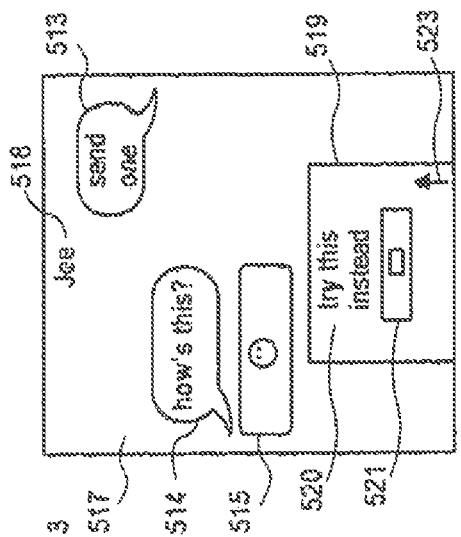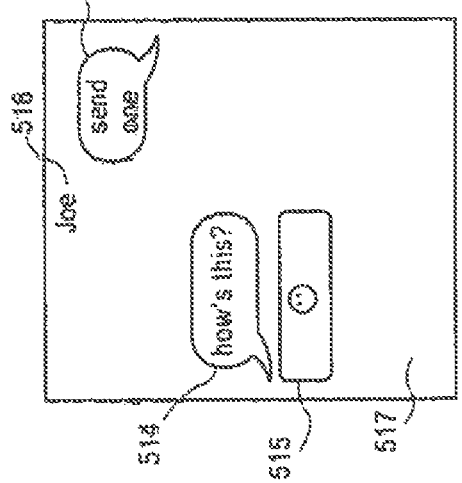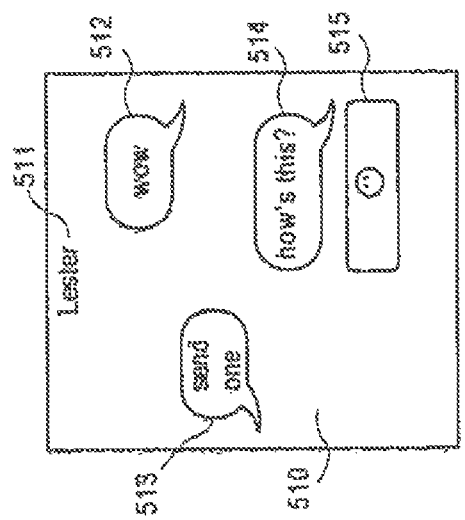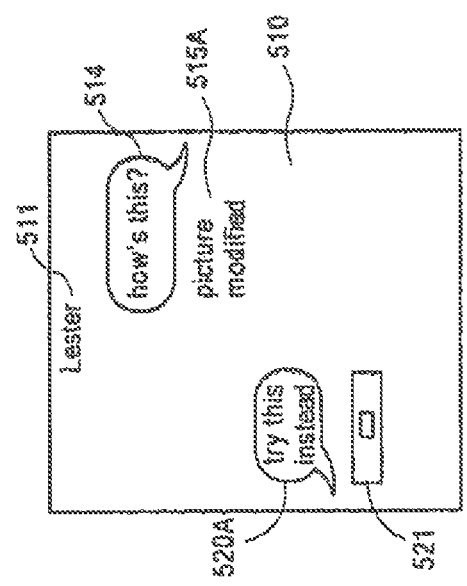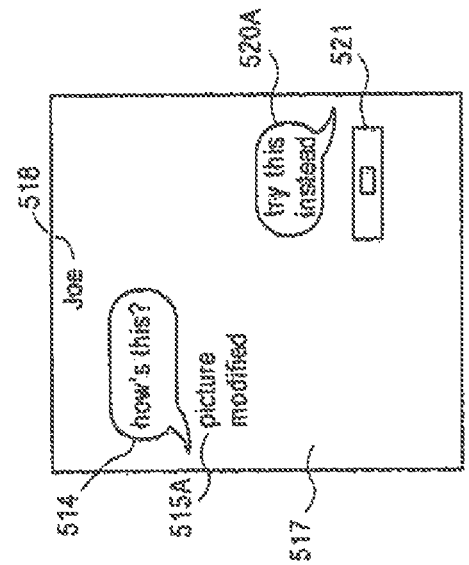

MESSAGING STICKER APPLICATIONS

This application claims the benefit of U.S. Provisional Patent Application No. 62/349,091, filed on Jun. 12, 2016, which provisional application is incorporated herein by reference. This application is also related to and claims the benefit of the following U.S. Provisional Patent Application numbers (all of which are incorporated herein by reference): 62/349,101, filed Jun. 12, 2016; and 62/349,113, filed Jun. 12, 2016.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, Calif. have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

SUMMARY OF THE DESCRIPTION

One aspect of the embodiments described herein relate to a messaging system which includes, on a client device, a messaging app and one or more extension apps configured to create content that is displayed in a view hosted by the messaging app. The messaging app can launch the one or more extension apps, and content in one embodiment is communicated between each extension app and the messaging app through an interprocess communication. In one embodiment, a method can include: receiving, by a first messaging application on a first device, a message and associated metadata from a second device, the message including content created by a second extension app that operated with a second messaging app on the second device. The first and the second messaging apps are in one embodiment each configured to transmit Short Message Service (SMS) text messages and other content and display those text messages in a message transcript. The method can further include displaying the content in a message transcript in a user interface view of the messaging app, and communicating the content to a first extension app identified by an app identifier in the metadata, from the first messaging app, the content communicated through an interprocess communication (IPC) from the first messaging app, which executes in a first process, to the first extension app which executes in a second process that is distinct from the first process. The method can further include displaying a user interface of the first extension app within the user interface of the first messaging app.

In one embodiment, the user interface of the first extension app is configured to display the content, such as the content created by the second extension app on the second device, and to receive user input to modify the content. In one embodiment, the user interface of each of the extension apps, when displayed, can replace an on-screen keyboard of the messaging app. In one embodiment, the first extension app can modify the content and pass the modified content to the first messaging app through an IPC, for transmission to the second messaging app for delivery to the second extension app on the second device. In one embodiment, the first extension app and the second extension app are two instances of the same extension app and are each identified by the same app identifier which can be provided by an app marketplace or other service which provides for the downloading of the extension apps.

In one embodiment, the first extension app can be configured to receive an obfuscated identifier of the user of the other device (second device), wherein the obfuscated identifier can be configured to be unique to the first extension app relative to all other extension apps on the first device. The obfuscated identifier allows each extension app to identify users in a collaborative environment, such as an environment in which multiple users are attempting to schedule a meeting or reserve a table at a restaurant, etc.

In one embodiment, the first extension app can change the view that is hosted by the messaging app. For example, in one embodiment, the first extension app can call, through an Application Programming Interface (API), to the first messaging app to request a change of the extension app's view within the first messaging app. In one embodiment, the change of the extension app's view is a switch between a compact view and an expanded view. In one embodiment, the user interface of the extension app in the compact view can be displayed in a screen region where an on-screen keyboard of the first messaging app was displayed while the first messaging app's message transcript remains viewable. In another embodiment, the compact view of the extension app can be displayed as an overlay on the on-screen keyboard. In one embodiment, the extension app's view in the expanded view is displayed in a screen region where both the on-screen keyboard and the message transcript were displayed such that the message transcript is not viewable and the on-screen keyboard of the first messaging app is also not viewable.

In one embodiment, the metadata which is received from the second device can include a Uniform Resource Locator (URL) or other types or forms of resource locators (e.g. a Uniform Resource Identifier, (URI), XML, etc.) and data which are communicated by the first messaging app to the first extension app through an IPC, wherein the resource locator and data maintain session information between the second extension app on the second device and the first extension app on the first device. In one embodiment, the extension apps communicate through the respective messaging apps which host their views on each device. In one embodiment, each extension app can be configured to modify at least one of the resource locator or data and pass the modified resource locator or data to the other extension app through both messaging apps. In one embodiment, the modification of the resource locators or data can be implemented in a session in which the same session bubble in a message transcript is displayed over time as the information within the bubble changes as a result of user interaction on either side of the communication. In one embodiment, each extension app can also receive a call back from its corresponding messaging app which indicates whether the other extension app received the modified content, such as the modified resource locator or data.

Another aspect of the embodiments described herein relate to how an extension app is launched in response to a selection of a message bubble in a message transcript presented by a messaging application. A method according to this aspect can include: receiving, by a first messaging app on a first device a message and metadata from a second device, the message including content created by a second extension that operated with a second messaging app on the second device. The method can further include displaying the content in a message container, such as a message bubble, within a message transcript in the messaging app and then receiving a selection of the message container, such as a tap by a user's finger on the message bubble. The method can further include launching a first extension app, if it is installed on the first device in response to the selection of the message bubble, wherein the first extension app is identified for launching by an app identifier in the metadata received from the second device. In one embodiment the method can further include displaying, after the launching, a user interface of the first extension within the user interface of the first messaging app. In one embodiment, the message container can be a message bubble that is specified by a bubble identifier in the metadata, and the content can be associated with the bubble identifier so that the content created by the second extension app appears within the message bubble having that bubble identifier. In one embodiment, the first and the second messaging apps are each configured to transmit SMS text messages and other content and display the text messages in message bubbles in a message transcript. In one embodiment, the first messaging app and the first extension app are configured to communicate through IPC, and the first messaging app executes in a first sandboxed process and the first extension app executes in a second sandboxed process that is distinct from the first sandboxed process. In one embodiment, the content is displayed by the first messaging app before the selection of the message bubble without launching or executing the first extension app; in other words, the first extension app does not need to be executing in order for the content to be displayed in the message bubble by the first messaging app in one embodiment. In one embodiment, an API can exist between the first messaging app and the first extension app to permit communication through calls utilizing the API.

In one embodiment the content received by the first messaging app is received in an encrypted form and is decrypted by the first messaging app, and the decrypted form is passed, through an IPC, to the first extension app.

In one embodiment, the first messaging app can offer to download and install the first extension app if the first extension app is not installed. The first messaging app can maintain a registry (e.g., a list) of installed extension apps, and this registry can be used to determine whether an extension app is installed when, for example, the user taps on or selects a message bubble having content created by a particular extension. If in response to the selection of that message bubble the first messaging app determines that the particular extension app required to process the content (as specified by an app identifier provided along with the message) is not installed then the first messaging app can present a notice to the user which gives the user an option to select which will cause the device to download and install the extension app. In one embodiment, the downloading and installation of the extension app can be performed in the background while the first messaging app remains the foreground app on the device.

Another aspect of the embodiments described herein relate to methods for providing backward compatibility which can occur in situations when one device communicates with an older device or a device having an older messaging system which is not fully compatible with the newer messaging system. A method according to this aspect can include in one embodiment: creating, by an extension app executing in a first process, content displayed within a view hosted by a first messaging app on a first device, where the first messaging app executes in a second process that is distinct from the first process, and the content is communicated from the extension app to the first messaging app through an interprocess communication in response to a selection of a send command to cause the content to be sent to a second device. The method can further include determining, by the first messaging app from data about the second device, that a second messaging app on the second device is not compatible with the extension app, and then sending, by the first messaging app, an alternative content to the second messaging app. In one embodiment, this alternative content can include one or more of (a) an image in a standard format; or (b) a resource locator that can be used to retrieve a web page on the second device.

Another aspect of the embodiments described herein relate to an app marketplace or similar service which can, in one embodiment, provide browsable views of extension apps which can be downloaded and installed from the app marketplace or similar service. In one embodiment, the apps may be obtained for free or may be purchased and then downloaded and installed on a user device. In one embodiment, the downloading can occur in response to the selection of a message bubble containing content created by an extension app which has not been installed on the receiving device. In one embodiment, a method can include the following: receiving, by a first messaging application (app) on a first device, a message and associated metadata from a second device wherein the message includes content created by a second extension app that operated with a second messaging app on the second device, wherein the associated metadata includes an app identifier associated with the second extension app; displaying the content in a message transcript in a user interface view of the first messaging app; determining whether a first extension app identified by the app identifier is installed for use with the first messaging app; displaying a notice to a user, the notice including an option to cause the first device to download and install the first extension app, wherein the notice is displayed in response to determining that the first extension app is not installed for use with the first messaging app; and in response to a selection of the option, downloading and installing the first extension app. In one embodiment, the first device determines that the first extension app which is identified by the app identifier is not installed in response to the user's selection of the content in the message transcript (e.g., the user taps on the content in a message bubble in the message transcript). In one embodiment, the first extension app is downloaded from a service that provides multiple messaging extension apps for download, and the app identifier is provided by the service. In one embodiment, the service includes one or more server systems that include a browsable catalog of messaging extension apps which can be downloaded from the service. In one embodiment, the download and install of the first extension app can occur while the first messaging app remains the foreground app. In one embodiment the method can further include adding an icon representing the first extension app into a browsable view of installed extension apps, the browsable view displayed by the first messaging app, and the addition of the icon occurs after the first extension app is installed.

In one embodiment, the installed first extension app can communicate through an IPC with the first messaging app which executes in a first process which is different than the second process in which the first extension app executes.

Another aspect of the embodiments described herein relate to extension apps which are image creation apps such as apps that can create stickers and can modify the appearance of those stickers and can allow the placement of those stickers on one or more message bubbles in a message transcript provided by a messaging app. In one embodiment of this aspect, a method can include the following operations: receiving a selection, to create a sticker image, within a user interface view of a sticker extension application (app) hosted by a messaging app; receiving one or more user inputs which specify changes to the selected sticker image, the one or more user inputs defining image metadata; communicating the sticker image and image metadata to a first messaging app through an interprocess communication between the sticker extension app and the first messaging app; uploading, by the first messaging app, the sticker image, a message, and the image metadata to one or more messaging servers for delivery of the message and the sticker image and the image metadata to a receiving device; receiving and storing, by the first messaging app, a token from the one or more messaging servers, the token representing the sticker image; sending, by the first messaging app in response to a subsequent request to send the sticker image to the receiving device or to other receiving devices, the token to the one or more messaging servers without also sending the sticker image again. In one embodiment the method can also include displaying, by the sticker extension application in a view hosted by the first messaging app, a set of sticker images, each selectable by a user to associate with a message in a message bubble in a message transcript view provided by the first messaging app. In one embodiment, the user associates a sticker image with a message bubble by dragging the sticker image onto the message bubble. In one embodiment, the image metadata can include one or more of: (a) scaling data to vary a size of the sticker image; (b) rotation data to vary a rotation or orientation of the sticker image on the message bubble; (c) location data of the sticker image on the message or message bubble; or other image modification data (e.g. transparency or color variations, etc.). In one embodiment, the amount of data of the sticker image is constrained by the messaging system to remain below a predetermined limit. The first messaging app displays the sticker image on the message in a message transcript within a view of the first messaging app, and the size and rotation and location of the sticker image on the message can be specified by the image metadata. In one embodiment, the first messaging app can encrypt the sticker image for each receiving device to generate multiple encrypted sticker images when the message (with the sticker image) is sent to multiple receiving devices. For example, in one embodiment, a public key of each receiving device can be used to encrypt the sticker image (or to encrypt a key that is used to encrypt the sticker image), and each different receiving device can have different public keys. In one embodiment, an asymmetric encryption algorithm such as a public key/private key encryption algorithm can be used to encrypt the sticker images (or the keys that are used to encrypt those images). The method can also include receiving a time-to-live (TTL) value of the token from the one or more messaging servers, the TTL value being refreshed at the first messaging app and at the one or more messaging servers in response to the subsequent request to send the sticker image corresponding to the token. In one embodiment, the method can also include determining, by the first messaging app from data about the receiving device that the messaging app on the receiving device is not compatible with the sticker app and sending, by the first messaging app, alternative content to the receiving device when it is not compatible with the sticker app.

Another aspect of the embodiments described herein relate to methods for using the image metadata to render a final sticker image on a receiving device. A method according to this aspect in one embodiment includes the following operations: receiving, by a first messaging app on a first device, a message and a token and associated metadata (which can include image metadata) from a second device, the token referring to a sticker image created by a second sticker extension app that operated with a second messaging app on the second device; sending, by the first messaging app, the token to the one or more messaging servers to obtain the sticker image; receiving, by the first messaging app, the sticker image in response to sending the token and generating a final image by applying the image metadata to the sticker image; and displaying, by the first messaging app, the final image on or near a message bubble containing the message. In one embodiment, the first messaging app executes in a first process and the first sticker extension app executes in a second process that is distinct from the first process, and wherein the message bubble is identified by a bubble identifier. In one embodiment, the first messaging app receives the sticker image in an encrypted form and decrypts the sticker image and provides the decrypted form of the sticker image to the first sticker extension app through an IPC. In one embodiment, the image metadata comprises one or more of: (a) scaling data to vary a size of the sticker image; (b) rotation data to vary a rotation of the image sticker; or (c) other image modification data. In one embodiment, the first messaging app uses a hash of the sticker image to determine whether the first messaging app already has a copy of the sticker image before sending the token; in one embodiment, the hash can be contained in either the associated metadata or the image metadata. In one embodiment, the method can also include launching the first sticker extension app automatically in response to receiving the message, wherein the launching occurs without user action or intervention.

Another aspect of the embodiments described herein relate to systems and methods for operating one or more messaging servers in a messaging system. A method according to this aspect in one embodiment includes the following operations: receiving a plurality of encrypted sticker images for delivery to a plurality of recipients from a first messaging app, each of the plurality of encrypted sticker images representing the same sticker image when decrypted; creating and transmitting a plurality of tokens to the first messaging app, each of the plurality of tokens assigned for one of the plurality of recipients; creating a time-to-live (TTL) value for each of the encrypted sticker images and transmitting at least one of the TTL values to the first messaging app; storing the plurality of encrypted sticker images and the plurality of tokens and the TTL values; and receiving, from the first messaging app, one of the tokens in the plurality of tokens in response to the first messaging app sending the same sticker image again to one of the recipients in the plurality of recipients and refreshing the TTL value corresponding to the received token. In one embodiment, the method can also include sending, to a second messaging app on a receiving device, an encrypted sticker image in response to the second messaging app sending one of the tokens in the plurality of tokens, the sent token corresponding to the sent encrypted sticker. In one embodiment, the one or more messaging servers which can perform this method can also receive a plurality of encrypted messages, one for each of the plurality of recipients. In one embodiment, the one or more messaging servers can store the plurality of encrypted sticker images, the plurality of tokens, and the TTL values in a set of one or more databases. In one embodiment, the method can also include receiving, from the first messaging app, metadata associated with the same sticker image and transmitting, to the second messaging app, the metadata. In one embodiment, this metadata can be at least one of: (a) a sticker extension app identifier provided by a service from which extension apps can be downloaded; or (b) image metadata used by the sticker extension app that operates with the second messaging app to create a modified sticker image.

While the foregoing example describes the use of TTL values for stickers and sticker images, TTL values can be used for other objects and content that are sent or stored or received in a messaging system in one or more embodiments described herein.

In one or more embodiments, an indicator of the source of a sticker in a message transcript can be displayed. This can allow a recipient of the sticker to see who sent the sticker. The indicator in one embodiment can be a color that highlights or surrounds the sticker in the message transcript or alternatively, a recipient can select the sticker which can cause the display of a sticker details window that displays details about the sticker including the original artist or developer (or other source) of the sticker and the sender who may have modified the sticker. In one embodiment, the source or other attribution of a sticker displayed in the message transcript can be automatically displayed in the message transcript for a short period of time upon the first time a receiving device receives the sticker and thereafter the information about source or attribution is not displayed for that sticker.

In one embodiment, a method for operating in conjunction with a messaging app can launch an extension app in different ways depending upon the type of extension app or depending upon policies about extension apps. A method in one embodiment can include the following operations: determining a type of an extension app in response to receiving, by a messaging app, a message containing content created by the extension app; launching the extension app automatically in response to the receipt of the message if the extension is a first type of extension app or a policy for the extension app allows such launch (e.g. an extension app that requests immediate launching and the messaging app grants the request for the type of extension app or request, or the extension app is a predetermined type or its content is a predetermined type); deferring launching of the extension app, if the extension app is a second type of extension app (or a policy dictates deferring launch), until a selection is received of a message bubble displayed in a message transcript that is displayed by the messaging app. In one embodiment, the selection is received from a user who selects the message bubble in the message transcript. In one embodiment, the extension app specifies whether it operates as the first type or the second type of extension app, and the messaging app can apply one or more policies to allow automatic immediate launch or defer launch of the extension app. In one embodiment, the first type of extension app launches upon receipt but remains in the background (and can in one embodiment update content in its message bubbles while in the background) until a user causes the extension app to be displayed in the foreground (e.g. be displayed in compact view mode in place of the on-screen keyboard) when the user selects a message bubble displaying content from the extension app.

Another aspect of the embodiments described herein relates to the use of breadcrumbs in a session between two extension apps on two devices. In one embodiment, a method for using breadcrumbs can include the following operations: displaying, in a message transcript, a first message bubble containing (or associated with) first content created by a first extension app, the first message bubble having a session identifier maintained for use by a first messaging app; receiving, at the first messaging app on a first device, second content for a session that is occurring between the first extension app and a second extension app on a second device, wherein the session is identified by the session identifier; converting the first content into a breadcrumb and displaying a second message bubble containing (or associated with) the second content, wherein the first messaging app associates the session identifier with both the breadcrumb and the second message bubble. In one embodiment, the first extension app provides third content to be displayed as at least a portion of the breadcrumb. In one embodiment, the second content is created by the second extension app on the second device and is transmitted to the first device through a second messaging app on the second device. In one embodiment, the first messaging app converts the first content into the breadcrumb.

The methods and systems described herein can be implemented by data processing systems, such as one or more smartphones, tablet computers, desktop computers, laptop computers, smart watches, wearable, audio accessories, on-board computer, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 9D, 9E, 9F, 9G, and 9H show an example of the message transcripts on two different devices that are involved in a conversation between two messaging apps, one on each device, wherein the conversation involves a session between two extension apps. The user interface shown in FIGS. 9D, 9E, 9F, 9G and 9H show how content in message bubbles created by the extension apps can be converted into breadcrumbs according to one or more embodiments described herein.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
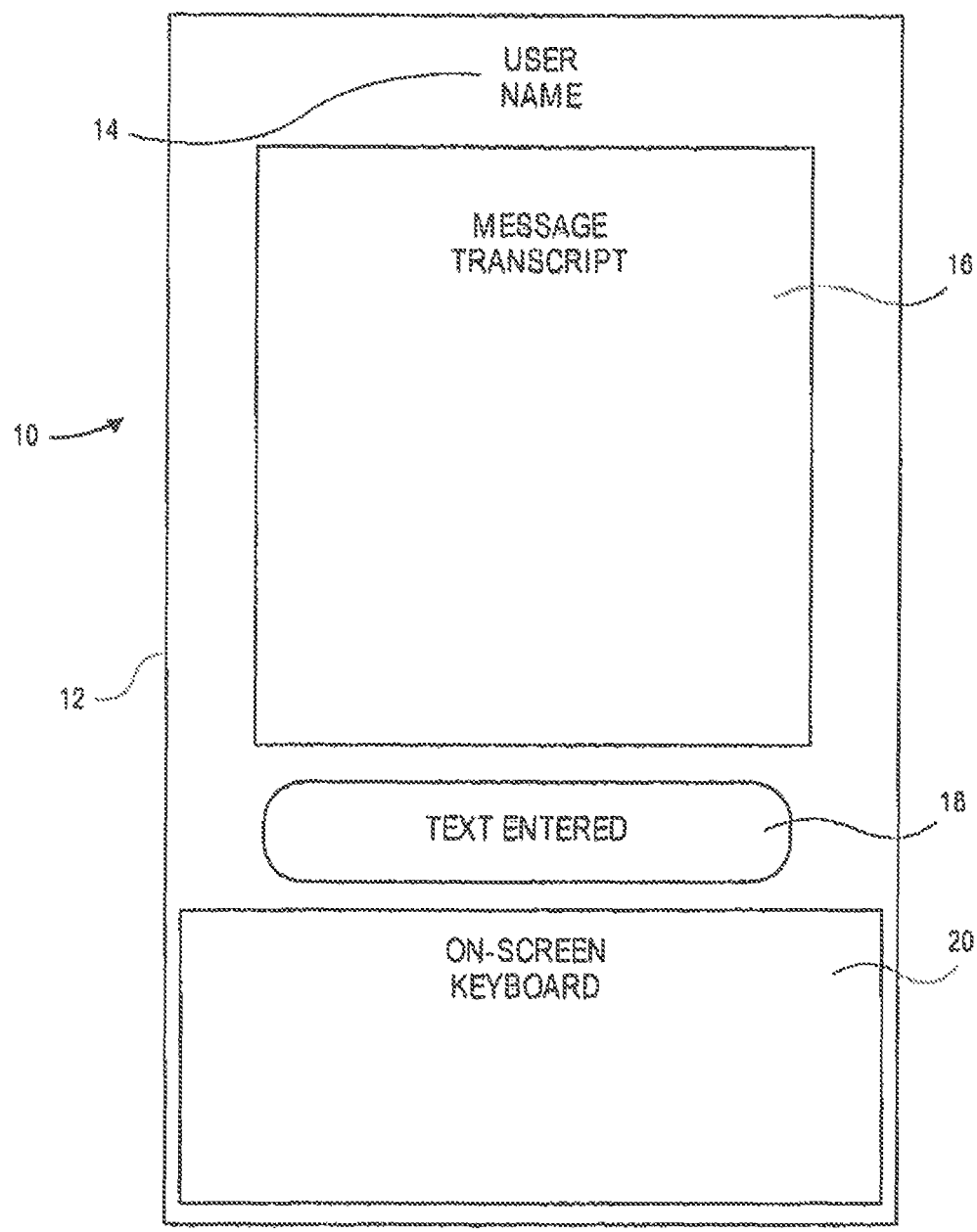
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
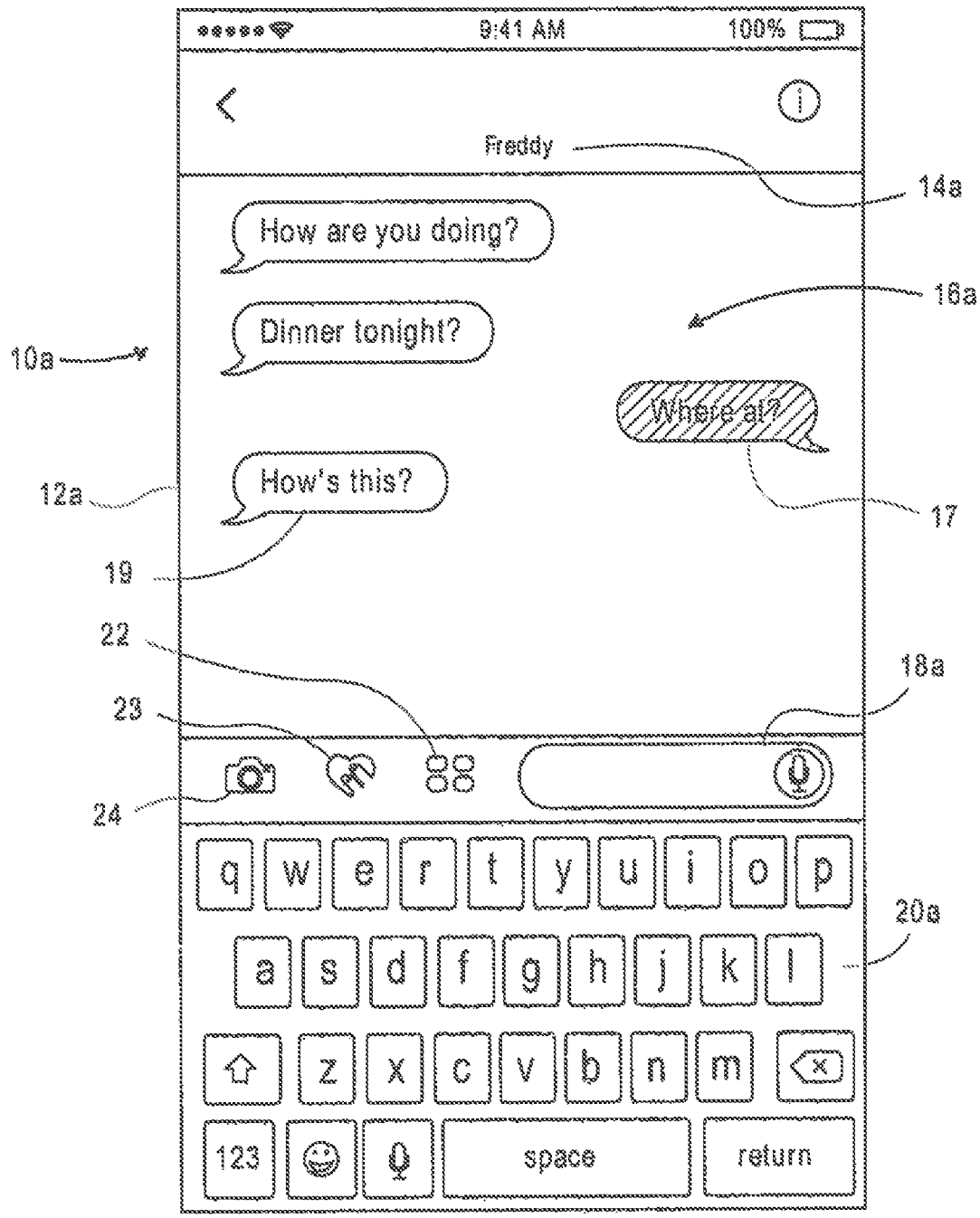
FIG. 1B shows another example of a user interface for a messaging app on a communication device.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view, such as the browsable view 157 shown in FIG. 4B to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process such as the plugin shown in FIGS. 5A, 5B, and 5C. The camera app icon 24 in one embodiment can, when selected, cause the communication device 10A to enter into a camera mode in which a camera of a device can capture still images or video images which can be placed into the message in order to send the image or video.

Figure 2:
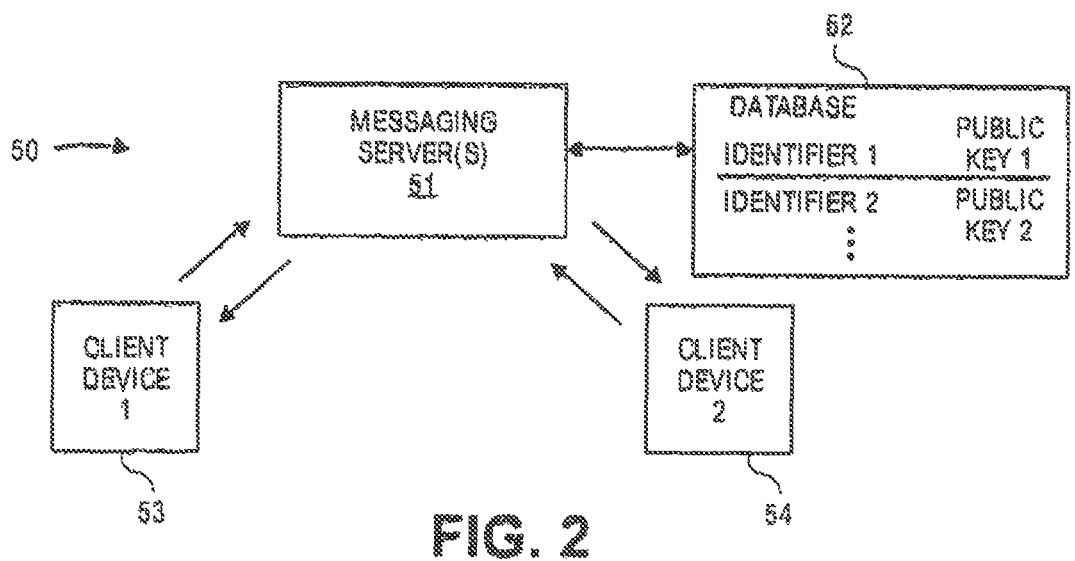
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content (e.g. as described relative to FIG. 13A) for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A messaging system in one embodiment on a client device includes a messaging app and one or more extension apps that each operate as separate processes. In one embodiment, the message app and the one or more extension apps can each be separate sandboxed processes that operate or execute in their own memory spaces. In addition, the messaging app can also operate with plug-ins, such as an image creation plug-in shown in FIG. 5A, which operate within the same process and memory space as the messaging app. The messaging app and each extension app communicate with each other through an interprocess communication, such as the XPC framework provided in iOS and Mac OS X. The messaging app is designed to receive text on a sending device from a user of the device and display the text in a message transcript and send the text, through a set of one or more messaging servers, to a receiving device which displays, through a counterpart messaging application on the receiving device, the received text in a message transcript on the receiving device. The receiving device and the sending device can each have a copy of the same extension app which are configured to create content of a certain type depending upon the particular extension app (or, in an alternative embodiment, each can include a copy of different extension apps that are compatible for the content used by them).

Figure 3A:
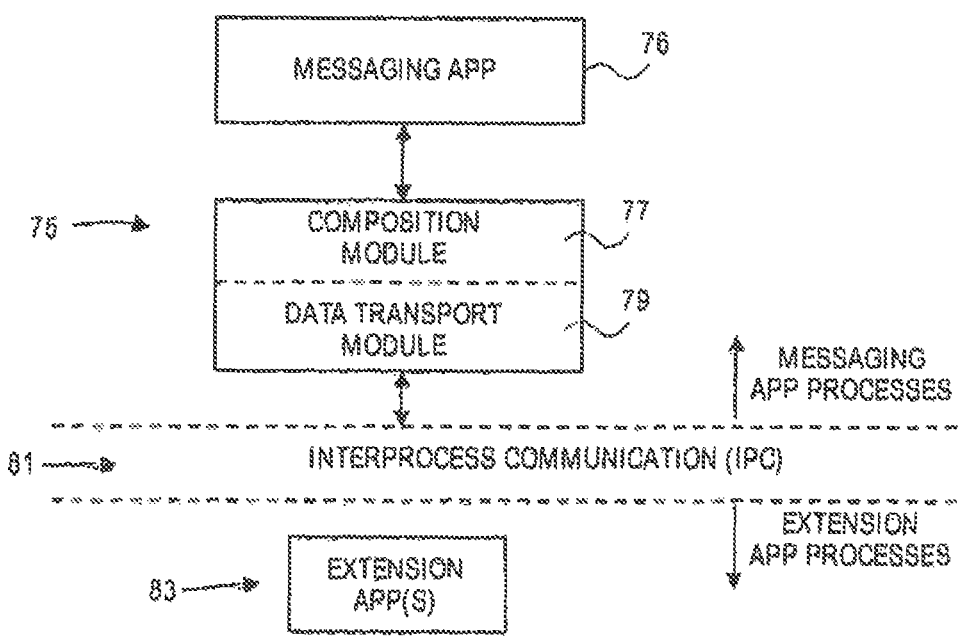
FIG. 3A shows a block diagram of an architecture for providing extension apps for use with a messaging app according to one embodiment.

FIG. 3A shows an example of a software architecture in which a messaging app and one or more extension apps operate together to provide an enhanced messaging system. As shown in FIG. 3A, the messaging system 75 includes a messaging app 76 and a set of plug-in modules, such as a composition module 77 and a data transport module 79 which are configured to communicate through an interprocess communication (IPC) 81 with the one or more extension apps 83. As shown in FIG. 3A, the messaging app and the composition module 77 and the data transport module 79 operate within the messaging app processes in a memory space controlled by a kernel on the communication device which executes the messaging system 75. The composition module 77 composes the content of a message bubble when the message bubble displays or otherwise presents content passed to the messaging app through the IPC 81. The data transport module 79 passes the content and other data to the extension app through the IPC 81 and receives the content and other data from the extension app through the IPC 81. Both modules 77 and 79 in one embodiment can have an extendable plug-in architecture that allows the addition of new plug-ins for new extension apps that generate new content or require a new data transport process. In this context, the plug-ins are additional software that operate within the same process as the messaging app. The composition module 77 can use a template to construct a message bubble such as the "MSMessageTemplateLayout" described below relative to FIG. 3C. The kernel can include a software library or software framework for providing the IPC 81 to allow communication between the messaging system 75 and the one or more extension apps 83. In one embodiment, the IPC framework can include a system area that is referred to as an extension point which provides APIs to allow for communication between the two different processes and to reinforce policies in terms of the types of communications which are permissible. In one embodiment, the communication through IPC involves the placement (writing) of content in a memory region by one process and the IPC framework allows another process to read from that memory region. In one embodiment, the messaging app 76 can launch automatically the extension app processes and can manage their lifetime, including the termination of those processes. In one embodiment, each of the extension apps 83 run in their own address space communication between the extension and the messaging app uses the IPC mediated by the system framework and they do not have access to each other's files or memory spaces. In one embodiment, each of the extension apps may be a sandboxed process which are separate from each other and the messaging app 76 can also be a separate sandboxed process which is separate from the sandboxed processes of the extension apps. Moreover, the extension apps can be provided with fewer system permissions relative to the messaging app so that the extension apps operate in a more restricted environment than the messaging app. Further information in connection with the use of interprocess communications for extensions can be found in U.S. patent application Ser. No. 14/488,122, filed Sep. 16, 2014 and published as U.S. Publication No. U.S. 2015/0347748, which application is incorporated herein by reference.

Figure 3B:
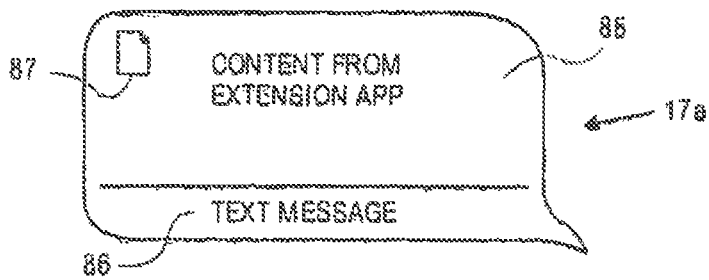
FIG. 3B shows an example of a user interface of a message bubble created at least in part by an extension app according to one embodiment herein.

In one embodiment the messaging app provides a view of content obtained from the extension app through the interprocess communication. The extension app can create the content in its own process and then provide that content in formats known to be acceptable to the messaging app (such as standard image formats or other standard formats). This allows the messaging app to then present the content from the extension app within one or more message bubbles within a message transcript (without needing to execute the extension app at least on the receiving device). FIG. 3B shows an example of a message bubble 17A which contains content created by and provided from an extension app, shown as content 85 which also can include a text message created by or provided by the extension app, such as text message 86. In one embodiment, the message bubble 17A can also include an icon 87 which can be the icon of the extension app which created the content 85.

Objects created by an extension app in one embodiment are shown in the message transcript on sending and receiving devices without launching the extension app. The extension app should provide enough information to construct a message bubble as part of the object. The object can consist of some opaque data encoded in a resource locator and a layout specification provided as a MSMessageTemplateLayout object.

MSMessageTemplateLayout is a subclass of MSMessageLayout and represents one method of specifying message bubble layout.

Figure 3C:
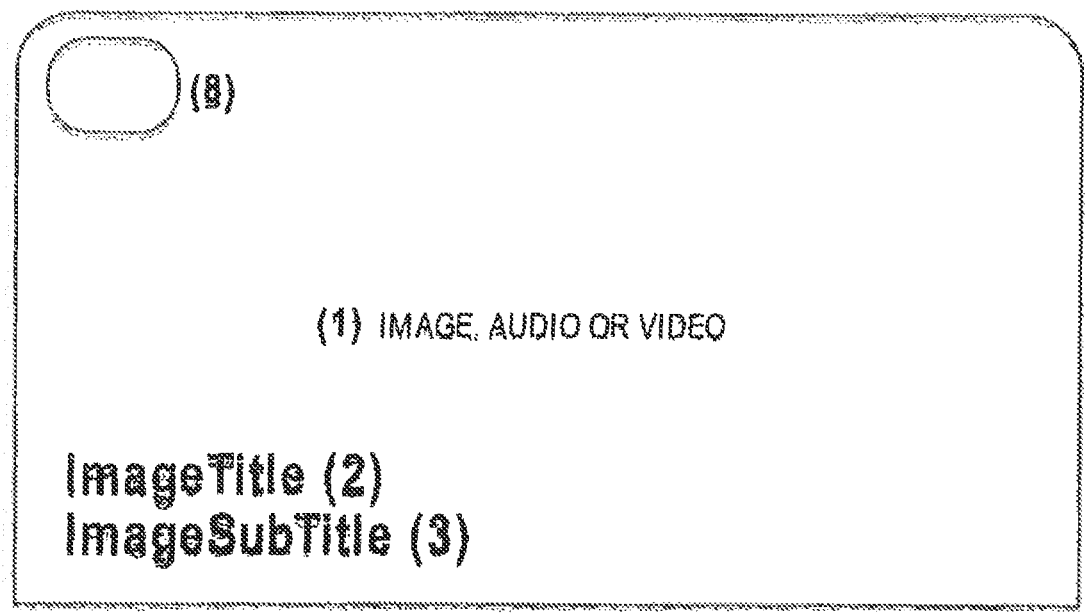
FIG. 3C shows an example of parts of a message bubble based on a template.

MSMessageTemplateLayout can have the following properties in one embodiment which are shown in FIG. 3C:

1) image or mediaFileURL: An image provide as a UIImage or as a file URL to an image file or a file URL to a video 2) imageTitle: A string the will be rendered on top of the image or movie 3) imageSubTitle: A string the will be rendered on top of the image or movie below the imageTitle 4) caption: A string the will be rendered in a caption bar below the image or movie 5) trailingCaption: A string the will be rendered right aligned in a caption bar below the image or movie 6) subCaption: A string the will be rendered in a caption bar below the caption 7) trailingSubCaption: A string the will be rendered right aligned in a caption bar below the trailingCaption 8) Extension icon: This is not provided as part of the MSMessageTemplateLayout but is derived from the bundle identifier of the extension that created the MSMessage.

The messaging app can use this information to construct the message bubble similar to the example shown in FIG. 3C.

The MSMessageTemplateLayout is serialized and transferred to the remote devices along with the opaque data. On receipt the messaging app on the receiving device will create a MSMessageTemplateLayout using the serialized data and use this to draw the message bubble in the receiver's message transcript.

In one embodiment, the extension apps which are configured to operate with a messaging app are not executable outside of the messaging application, and thus their life cycle is managed entirely by the messaging app. Moreover, as further described below, the downloading and installing of the extension apps can be controlled exclusively by the messaging app in one embodiment.

Figure 4A:
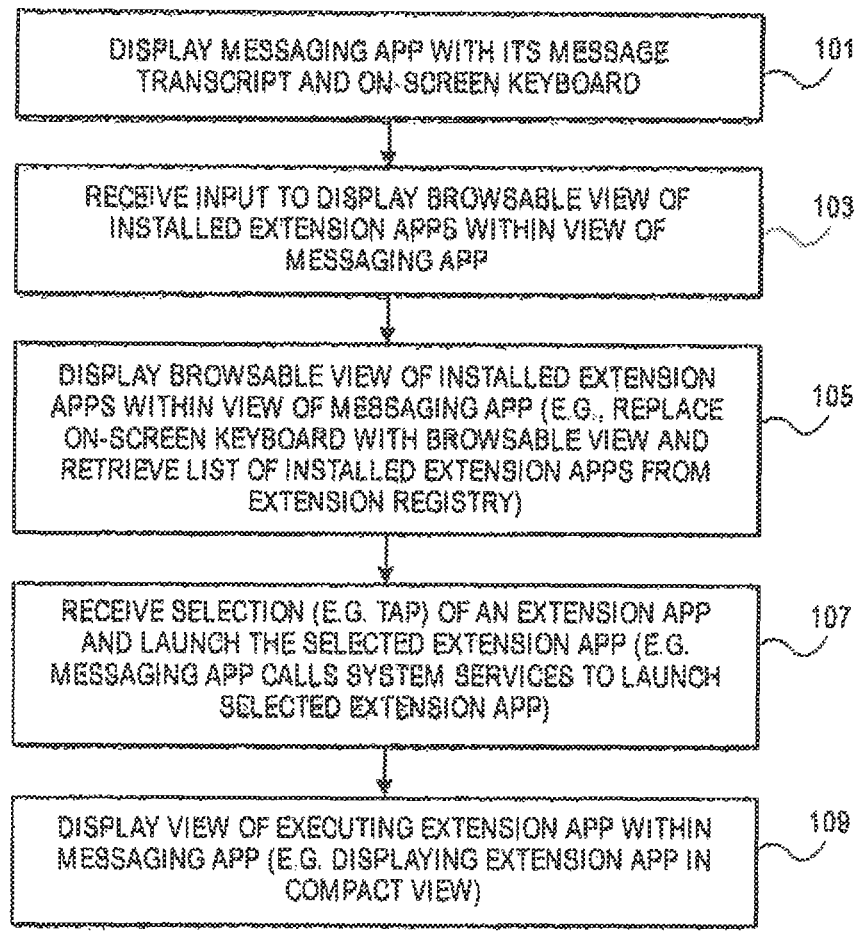
FIG. 4A is a flowchart which shows a method according to one embodiment for browsing, selecting, and launching an extension app from within a messaging app according to one or more embodiments described herein.
Figure 4B:
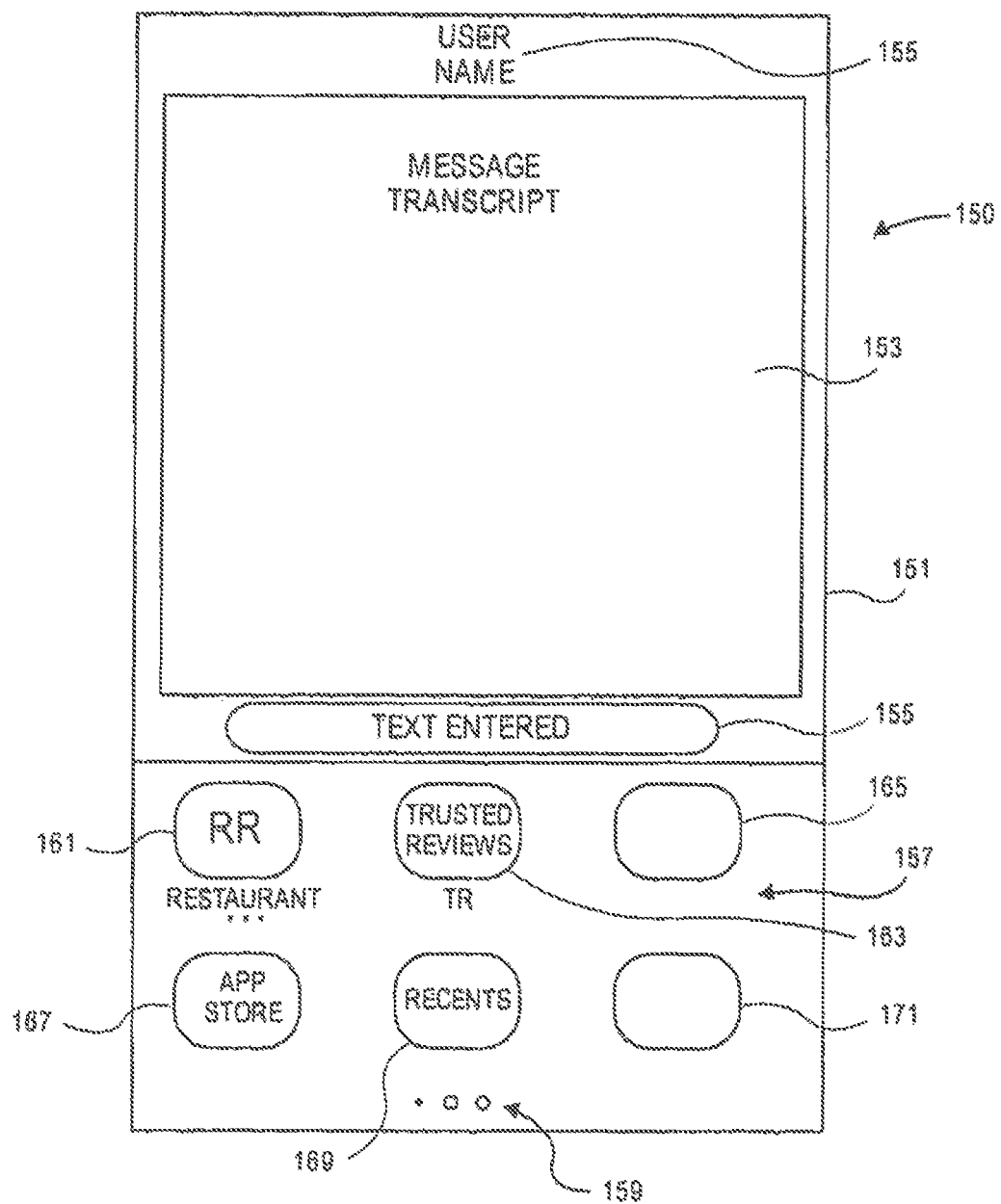
FIG. 4B shows an example of a user interface for a messaging app which includes a browsable view of installed extension apps according to one embodiment described herein.

In one embodiment, each extension app can be obtained from an app marketplace or distribution facility such as the Apple App Store (trademark) for message extension apps and can be launched from within the messaging app. FIG. 4A shows an example of a method according to one embodiment in which the installed extension apps can be browsed from within the messaging app, and a particular extension app can be launched to allow the user to interact with a particular extension app. The method can begin in operation 101 in which the messaging app displays its message transcript and an on-screen keyboard. FIG. 1B shows an example of a user interface of such a messaging app. Then in operation 103, the messaging app can receive an input to display a browsable view of installed extension apps within a view of the messaging app. For example, a user may tap on the icon 22 (in FIG. 1B) to select the icon which in turn causes the display of the browsable view in operation 105. In one embodiment, the browsable view of installed extension apps takes the place of the on-screen keyboard and retrieves the list of the installed extension apps from an extension registry which causes the display of icons for each of the installed extension apps. FIG. 4B shows an example of the result of operation 105 in which a browsable view 157 is displayed and takes the place of the on-screen keyboard of the messaging app as shown in FIG. 4B.

Figure 14A:
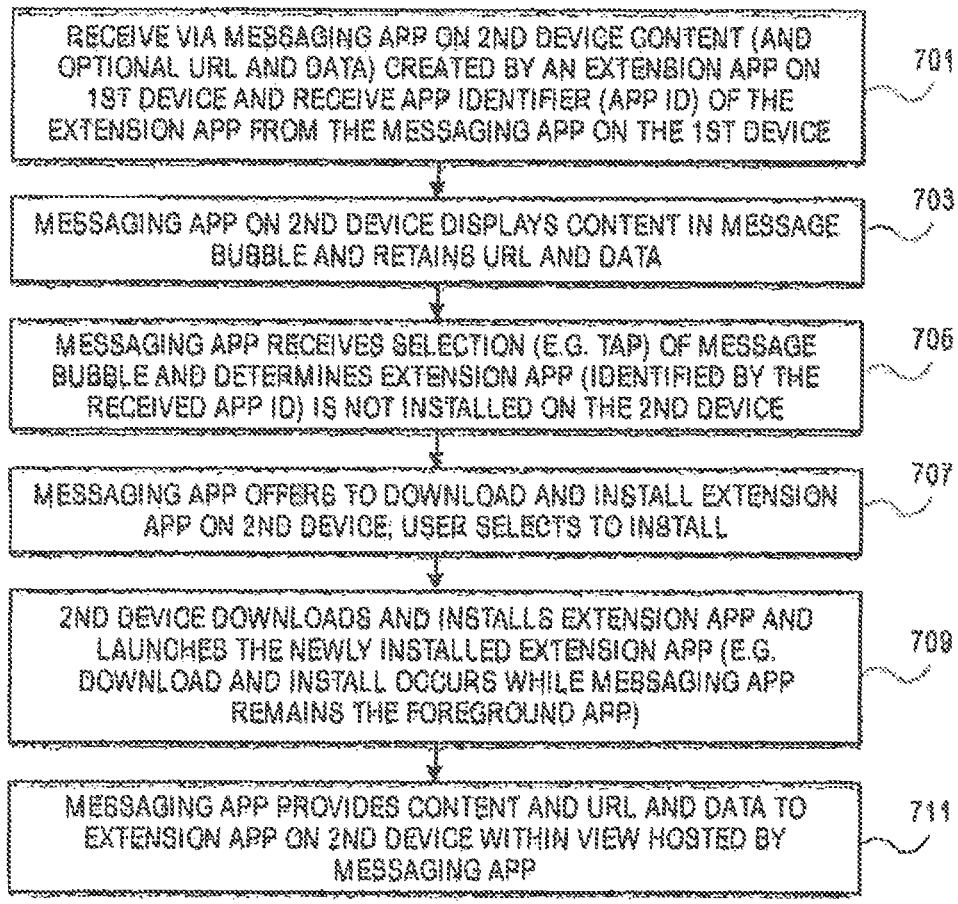
FIG. 14A shows a method according to one embodiment in which a receiving device (which has received a message) downloads and installs an extension app required to view or interact with the content in one of the messages.
Figure 14B:
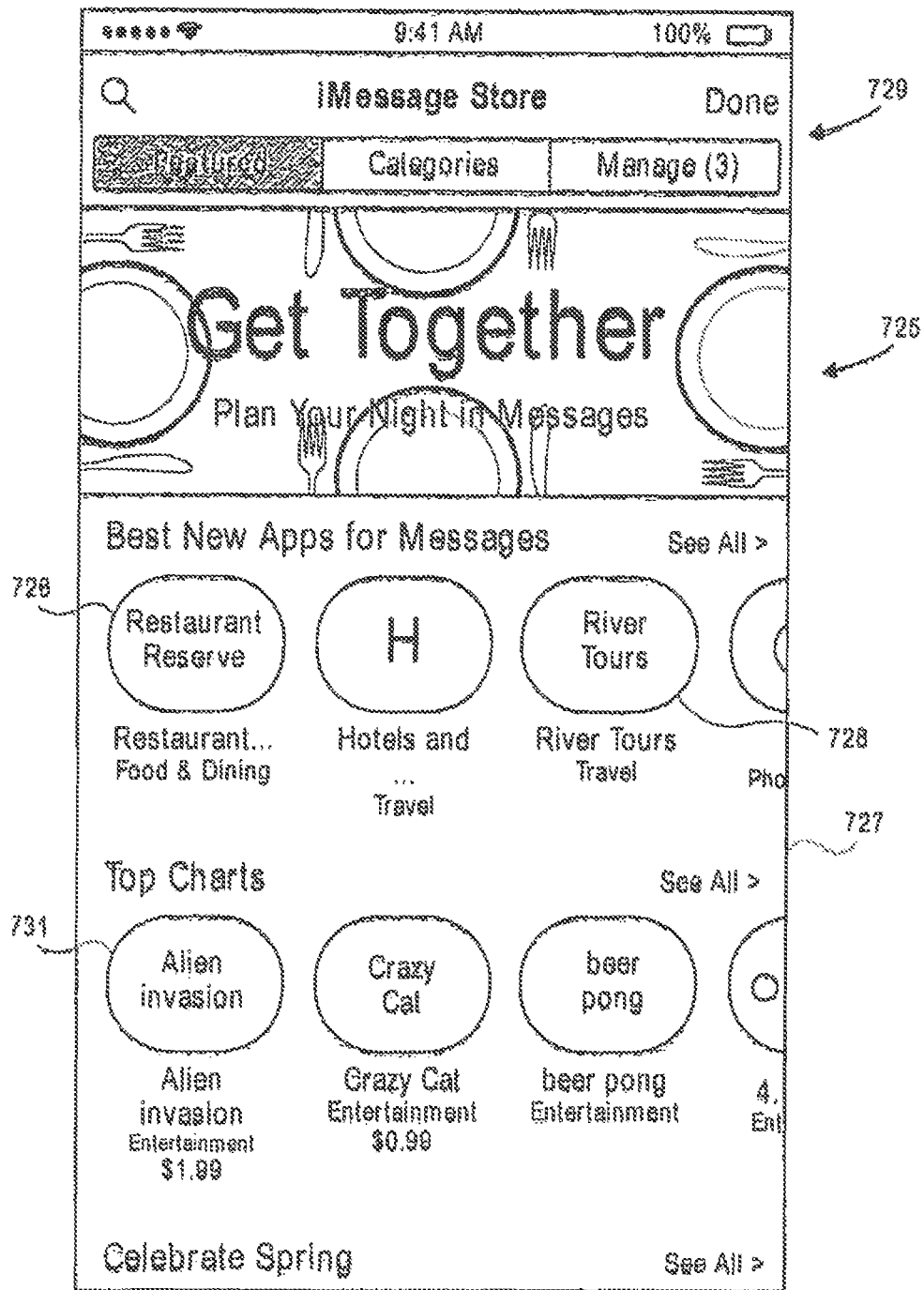
FIG. 14B shows an example of a user interface of an extension app marketplace or service from which extension apps can be downloaded and installed.

Referring to FIG. 4B, it can be seen that the browsable view 157 includes a plurality of icons each representing one of the installed extension apps that can operate with the messaging app that provides the user interface shown in FIG. 4B. The user interface of the messaging app shown in FIG. 4B includes a message transcript 153 shown in the upper portion of the touch screen 151 on the communication device 150 which executes the messaging app. A user name 155 of the other user (recipient of messages sent from communication device 150) is shown at the top of the user interface of the messaging app. A text entry region 155 (which shows text or other content that is staged or ready to be sent) is displayed between the message transcript 153 and the browsable view 157. In one embodiment, the browsable view is browsable by swiping the user's finger across the touch screen to cause the pages in the various views of installed extension apps to be displayed (and in one embodiment, can also show, for example, uninstalled extension apps that either need to complete a download process or need to complete an install process). In one embodiment, a page indicator 159 at the bottom of the user interface can show the current page of installed extension apps. In one embodiment, one of the icons can be reserved to launch or enter the extension app marketplace, an example of which is shown in FIG. 14B. In another embodiment the extension app marketplace can be displayed in the browsable view 157 in response to selecting icon 167. In the embodiment shown in FIG. 4B, the icon 167 is the extension app marketplace icon which can be selected to cause the presentation of the extension app marketplace, such as the extension app marketplace shown in FIG. 14B. In the embodiment shown in FIG. 4B, the icon 169 can be selected (e.g. user taps icon 169) to cause the display in the browsable view of recently sent stickers or handwritten messages or other recently sent items or recently used apps, etc. The display of recently sent items, etc. can in one embodiment be provided by a plug-in operating within the messaging app's process. Other extension apps include a restaurant reservation app icon 161 which can be an extension app that can be used to engage a restaurant reservation service, such as Open Table. Another example of an extension app is represented by icon 163 which when selected launches a restaurant review app which provides reviews of restaurants and which can be similar to the reviews provided by Yelp, for example. The other extension app icons 165 and 171 represent other extension apps which are installed and which can be launched by selecting one of those extension app icons.

Referring back to FIG. 4A, once the browsable view is displayed by operation 105, the user can select one of the extension apps by selecting the corresponding icon which in turn causes the launching of the selected extension app in operation 107. In one embodiment, the messaging app calls a system service to launch the selected extension app and prepare it for execution as an extension of the messaging app using the architecture shown, for example, in FIG. 3A. Once the selected extension app has been launched and is executing, the messaging app, such as messaging app 76 can host the view of the content provided by the executing extension app through the IPC framework as described herein. For example, in operation 109 shown in FIG. 4A, the messaging app can display a view of the content provided by the extension app within a portion of the view of the messaging app. FIGS. 5A through 5F will now be described as examples of how the messaging app hosts the view of the content of the executing extension app.

Figure 5A:
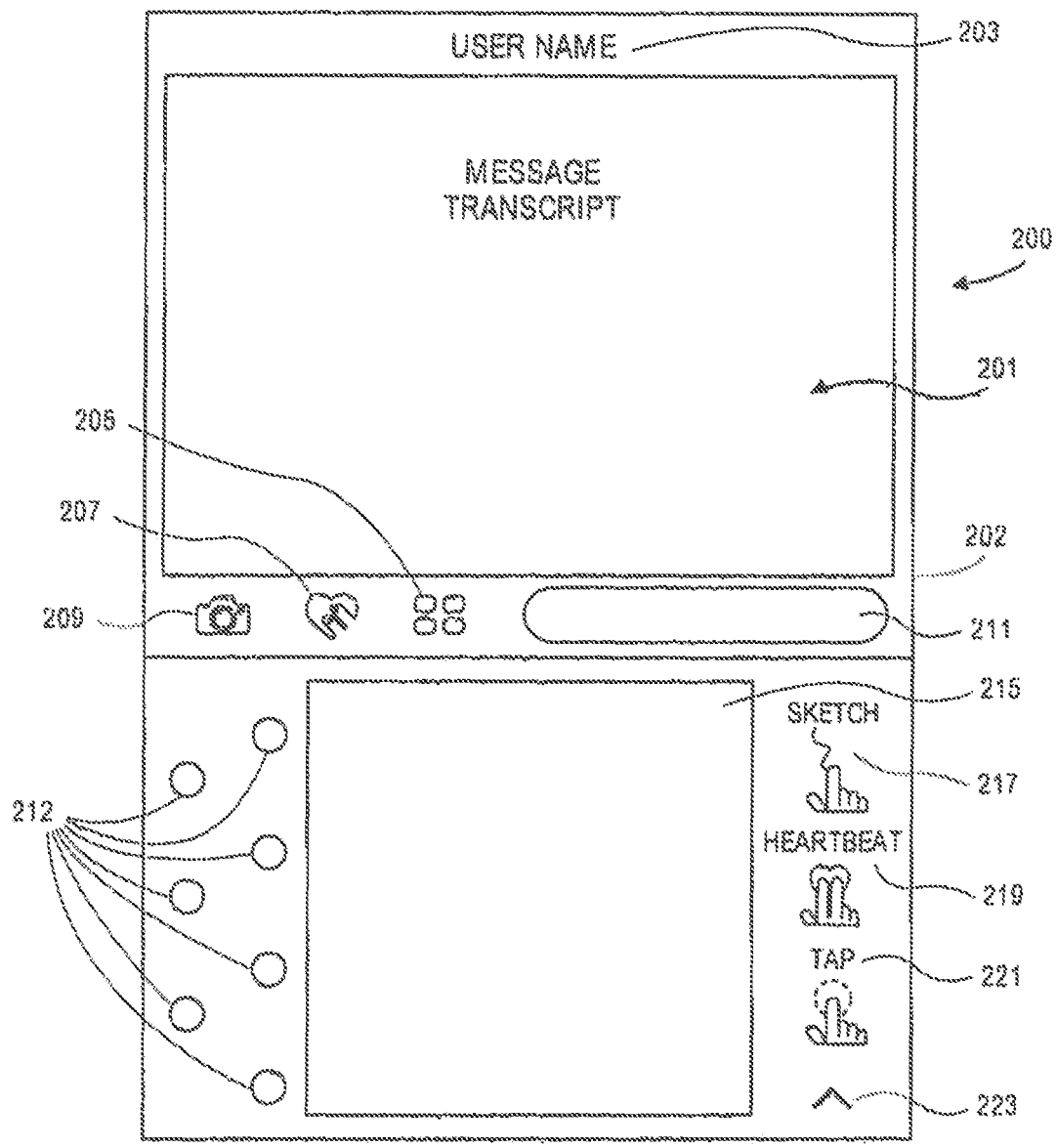
FIG. 5A shows an example of a user interface of a messaging app which includes a view of an extension app within the user interface of the messaging app.
Figure 5B:
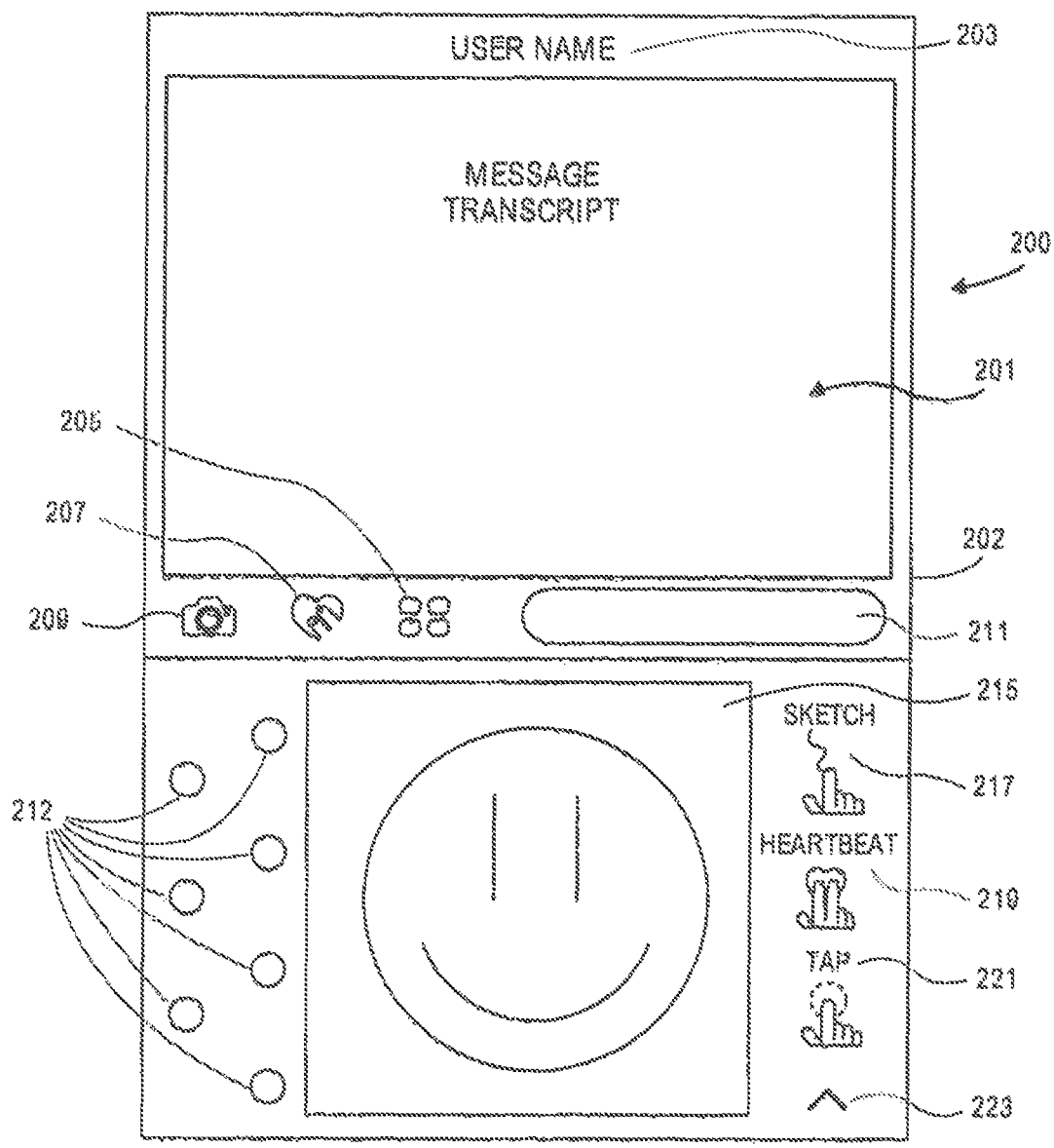
FIG. 5B shows an example of a user interface of an extension app, after the user has created content in the extension app, wherein the view of the extension app is hosted within the user interface of the messaging app.
Figure 5C:
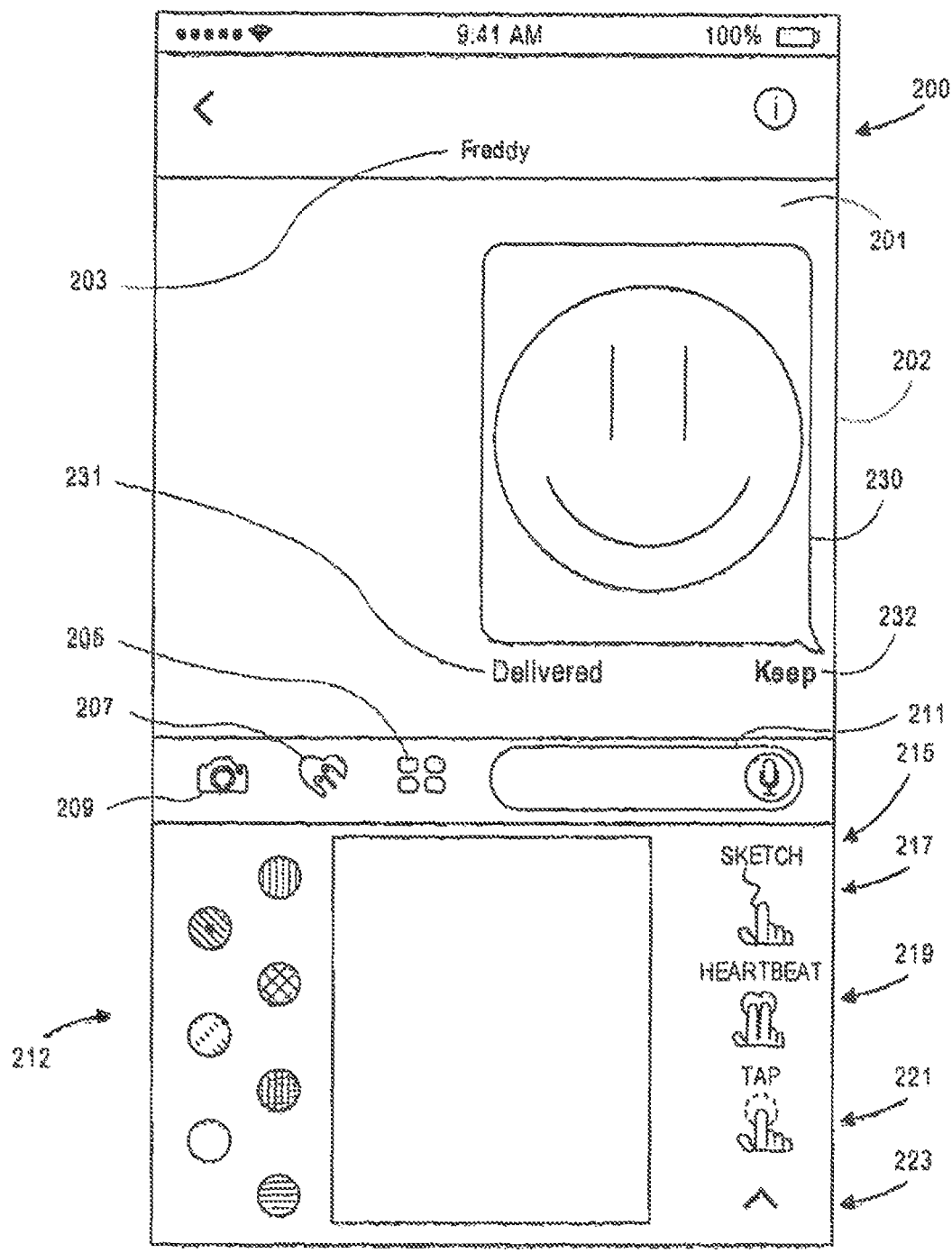
FIG. 5C shows an example of a user interface of a messaging app on a communication device after the user has created content using an extension app and has sent the content by using the messaging app to send the content.

FIG. 5A shows an example of a messaging app that hosts a view of a plug-in of a messaging app that is an image creation app launched by selecting the icon 207 (e.g. icon 207 is touched or tapped or otherwise selected by a user). In another embodiment, the plug-in shown in the bottom portion of the user interface shown in FIG. 5A may be launched by selecting one of the icons in the browsable view 157 shown in FIG. 4B. While the example shown in FIG. 5A can be implemented as a plug-in of the messaging app, in another embodiment, the example shown in FIG. 5A can be an extension app. In the example shown in FIG. 5A, the view of the plug-in (or extension app) has taken the place of the on-screen keyboard of the messaging app, but the message transcript of the messaging app is still viewable and displayed in the user interface, allowing the user to scroll through the message transcript in one embodiment to see the entire transcript. In another embodiment, the view of the plug-in or extension app is an overlay on top of the on-screen keyboard, a portion of which may be viewable. The transcript is displayed on the touchscreen 202 in one embodiment on the communication device 200. The user interface of the message app also includes the user name 203 which presents in one embodiment the name of the other user in the conversation or chat. The user interface of the message app also includes the text entry region 211 which is similar to the text entry region 18A and the text entry region 155. The plug-in (or extension app) includes a drawing canvas 215 and various controls and options which can be selected by the user to draw or create images. Drawing controls 212 in one embodiment can allow the users to select different colors to sketch on the drawing canvas if the sketch option 217 is selected. The plug-in (or extension app) can also provide taps as a message if the tap option 221 is selected. The plug-in (or extension app) can also provide heartbeats if the heartbeat option 219 is selected. In one embodiment, the sketch, heartbeat, and taps can be similar to the sketch, heartbeat and taps on the Digital Touch application which is available on the Apple Watch. The plug-in (or extension app) also includes an expanded view icon 223 which when selected can cause the plug-in (or extension app) to switch from its current compact view shown in FIG. 5A to an expanded view, such as the expanded view shown in FIG. 7B. In the example shown in FIG. 5A, the user has just launched the plug-in image creation app (or an extension app in the alternative embodiment) and has not yet created any content. This can be contrasted with the state of the plug-in (or extension app) shown in FIG. 5B in which the user has created a happy face sketch by using the sketch option 217 and by drawing on the drawing canvas 215 with, for example, the user's finger. The user can then cause the drawing to be sent to the other user (or users) who would be recipients for the message. Thus for example, the user of the device 200 can select a send command from within the messaging app executing on communication device 200 to cause the content created by the plug-in (or extension app) to be sent to the recipients. The result of the sending operation is shown in FIG. 5C in which the happy face has been sent to Freddy as indicated by the user name 203. The message bubble 230 shows the happy face sketch that was created by the plug-in (or extension app); in the case of the extension app, this created content was communicated from the extension app through the IPC frame work to the messaging app and then presented within the message bubble 230 to show that the message containing that content was transmitted to one or more recipients. In one embodiment, a delivery indicator 231 can indicate that the message was delivered and a keep control 232 can be provided to the user to allow the user to retain the content in the message transcript in those embodiments in which the content can be automatically eliminated after a period of time.

Figure 5D:
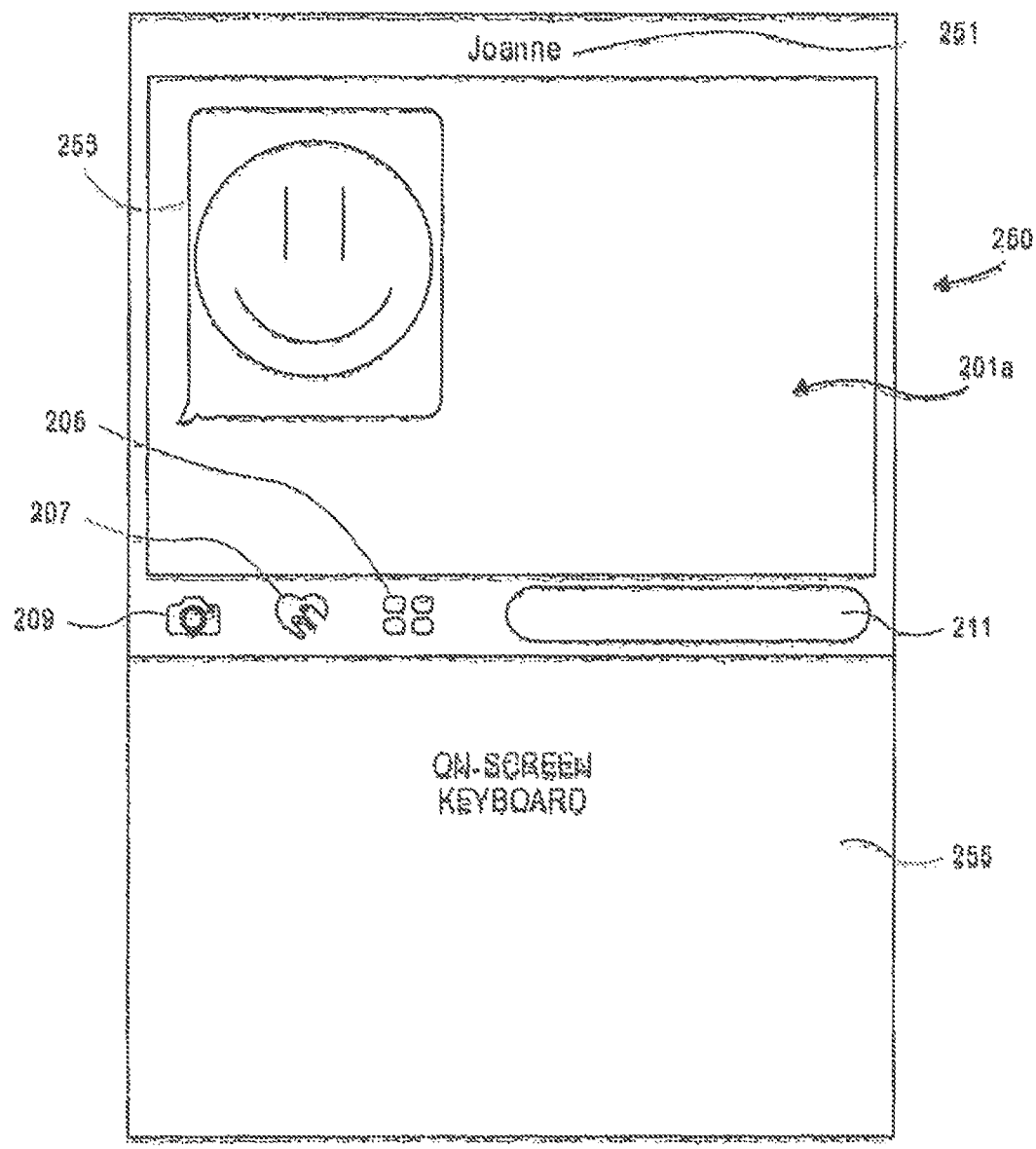
FIG. 5D shows an example of a user interface in a messaging app on a receiving device after the receiving device receives content created by an extension app on the sending device.
Figure 5E:
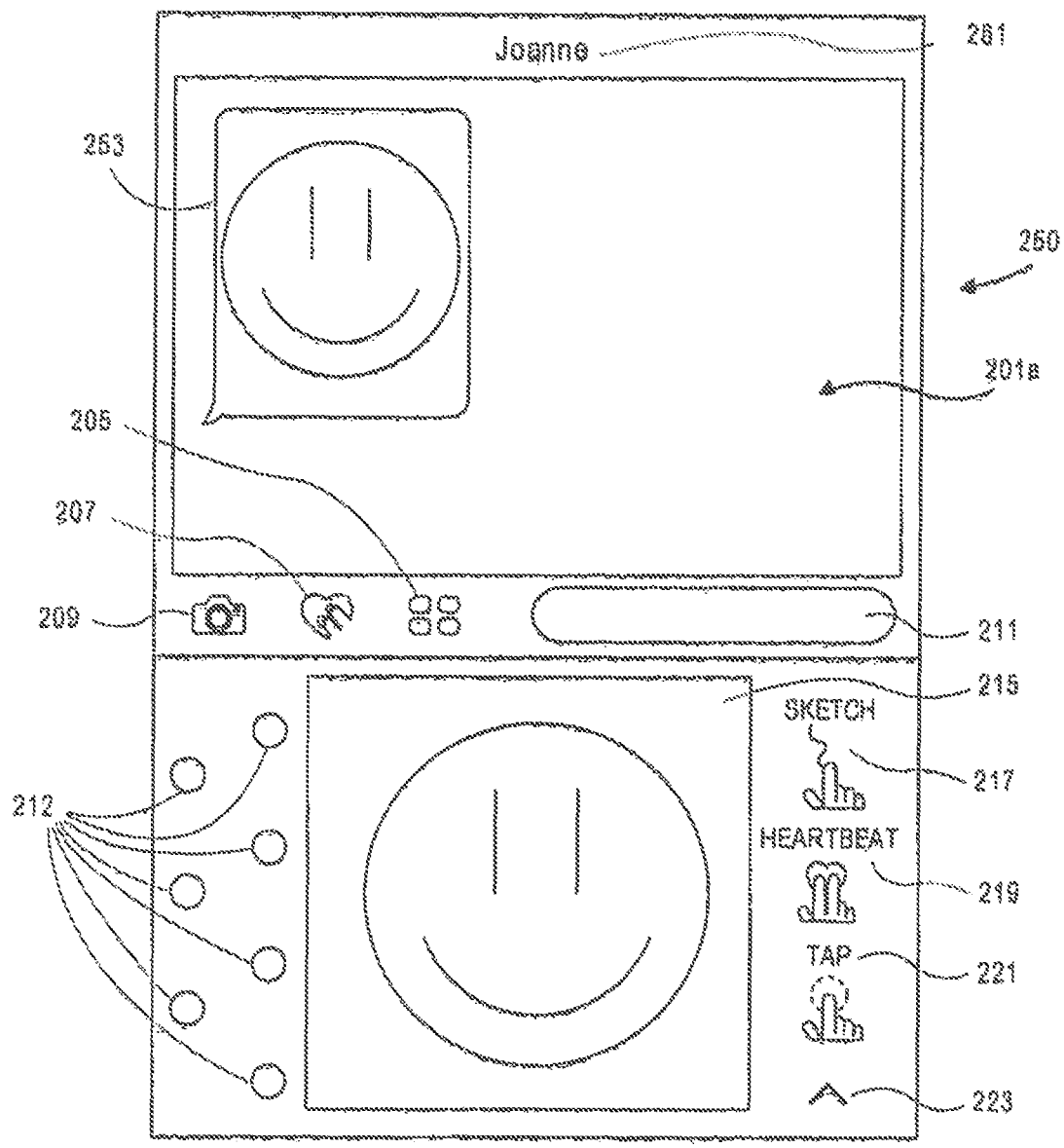
FIG. 5E shows an example of a user interface on a receiving device when the user of the receiving device selects the message bubble containing the content created by the extension app on the sending device so that the user of the receiving device can edit the content on the receiving device.
Figure 5F:
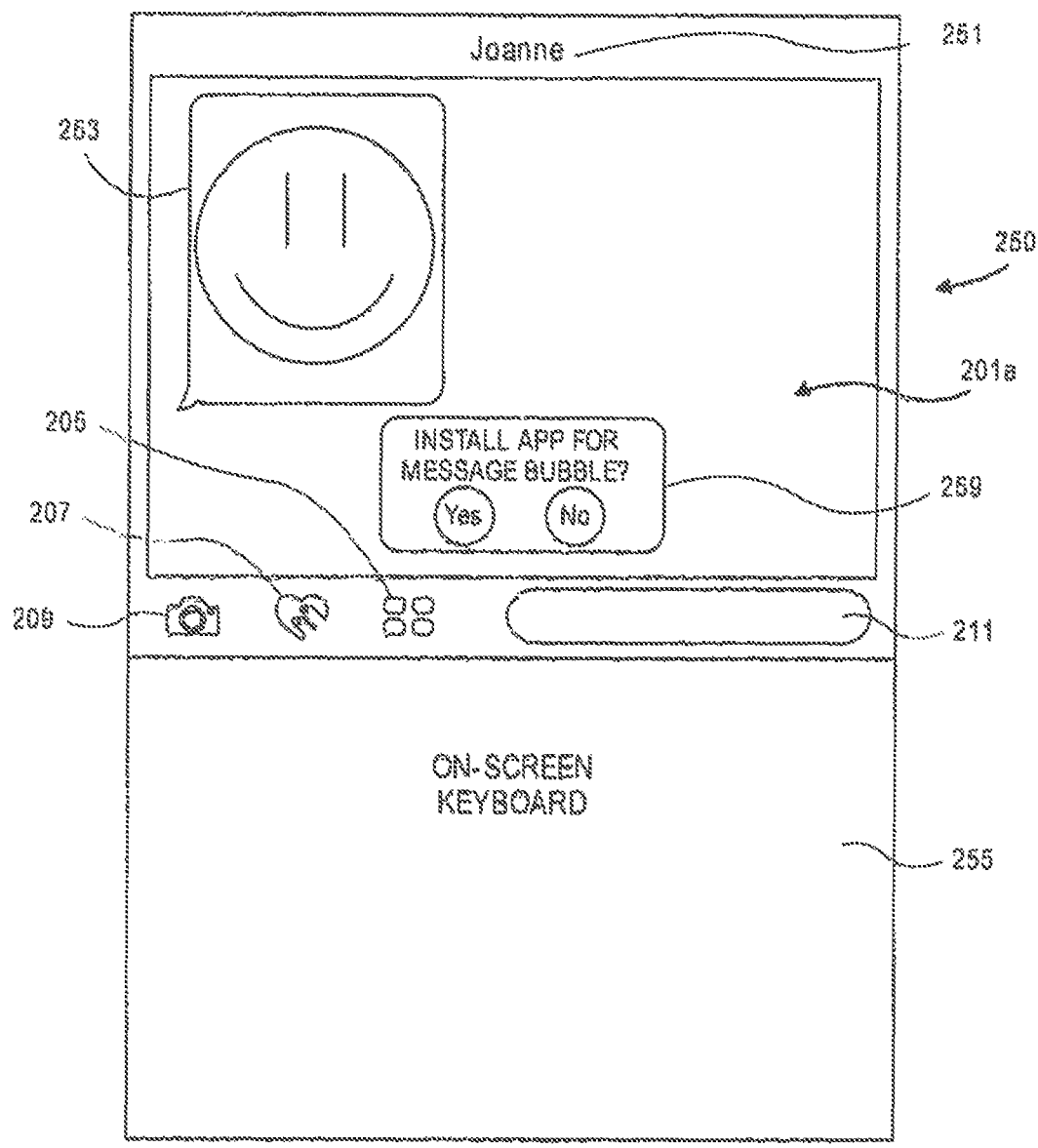
FIG. 5F shows an example of a user interface which offers to download and install an extension app for use with the messaging app on the device.

FIGS. 5D, 5E, and 5F illustrate what can happen on the receiver's device in response to receiving the content from the communication device 200 shown in FIG. 5C. Also, the flowchart shown in FIG. 6 can show the method performed at the receiving device, such as the communication device 250 shown in FIGS. 5D, 5E, and 5F. Referring now to FIG. 5D, it can be seen that the communication device 250 (used by Freddy) has received the happy face content which is shown in message bubble 253. This content was created by the extension app executing on communication device 200 which provided the happy face content to the messaging app executing on communication device 200 which in turn transmitted that content through a messaging service (e.g., a set of messaging servers, such as the messaging servers 51 shown in FIG. 2) to the messaging app executing on the communication device 250 which in turn presented the content in the message bubble 253. In one embodiment, the content can be rendered by the messaging app as it uses known standard formats (including standard image, audio, and video formats in one embodiment) and thus the extension app need not be installed or executing in order to show the content created by the counterpart (remote) extension application on the sending device. Thus in this case as shown in FIG. 5D, the message bubble 253 can present the content even though the counterpart extension application may not be executed or may not even be installed on the communication device 250. The messaging app shown in FIG. 5D includes, in its user interface, a message transcript 201A, a text entry region 211, and an on-screen keyboard 255. In one embodiment, content received from a remote extension app will not cause the launching automatically of the corresponding extension app on the receiving device even if the corresponding extension app is installed. In this embodiment, the corresponding extension app on the receiving device can be launched by the user's selection of the message bubble containing the content created by the remote extension app. If the user does select that content by, for example, touching or otherwise selecting the message bubble 253, then the extension app that corresponds to the remote extension app will be launched if installed on the communication device 250. The result is shown in FIG. 5E in which the user interface of the extension app has occupied the space in which the on-screen keyboard 255 was previously displayed and shows the happy face drawing within the canvas 215 allowing the user of the communication device 250 to alter or otherwise modify that sketch and perhaps send it back to the other user in the chat session or conversation. If, on the other hand, the corresponding extension app is not installed on the communication device, then in one embodiment the messaging app can present a notice to the user asking or offering to install the app for the particular message bubble which was selected. An example of this is shown in FIG. 5F in which the notice 259 includes two user selectable options, one of which will install the required app for the message bubble. In another embodiment, a sheet that shows a page of information from an extension app marketplace can be displayed within the view of the messaging app.

In one embodiment, the message transmitted from the remote device to the communication device 250 contains metadata which specifies the remote extension app used to create the content. In one embodiment, this metadata can be an app identifier, such as an identifier provided by an app marketplace or an extension app marketplace from which the extension apps can be downloaded and installed or can be a different identifier that can be associated with the identifier used by the app marketplace. In one embodiment, the notice 259 can result from the selection of the message bubble 253, while in another embodiment it can result automatically if the app identifier in the metadata for the content is not installed when the content for the message bubble 253 is received by the communication device 250.

Figure 6:
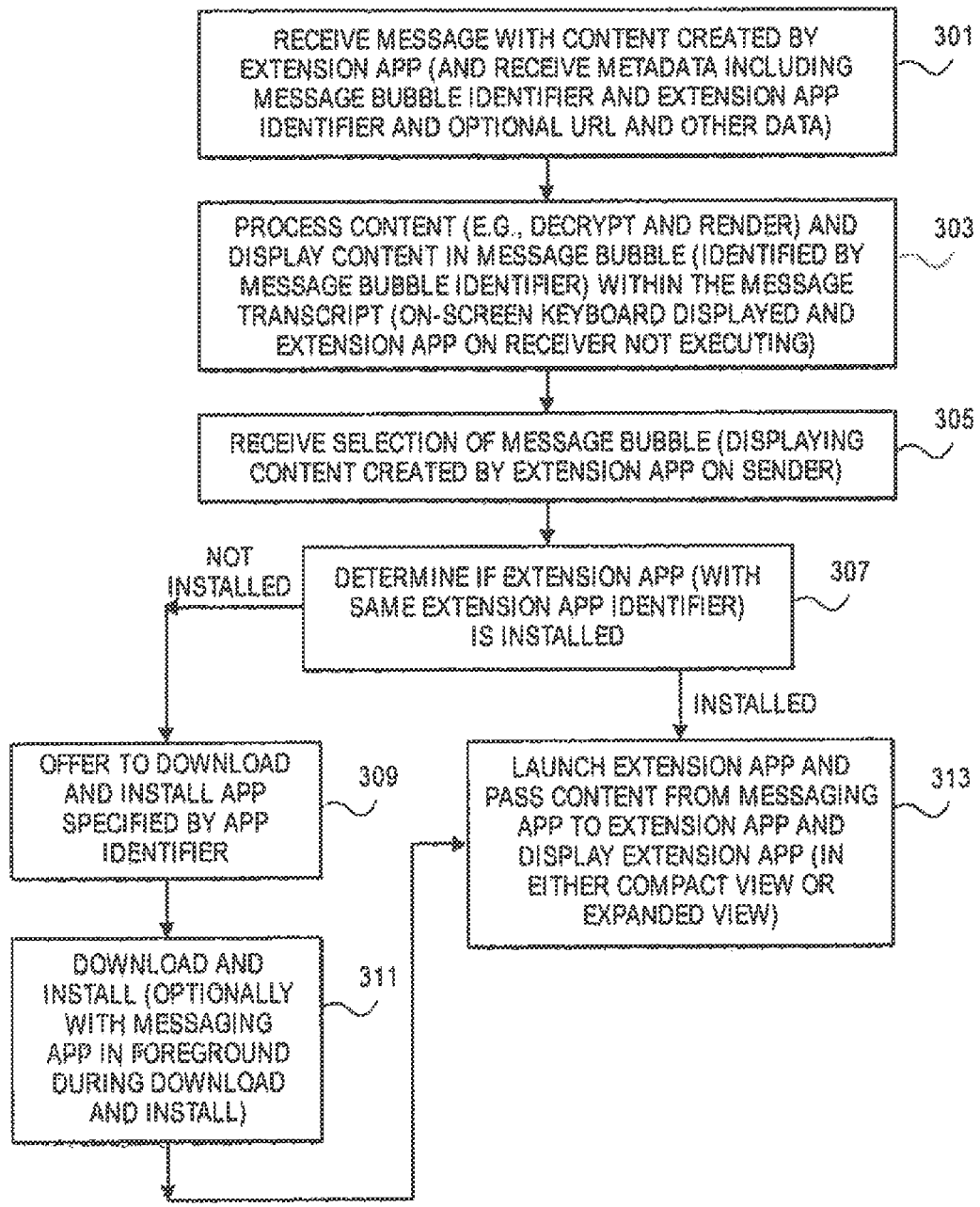
FIG. 6 is a flowchart which illustrates a method which can be performed on a receiving device according to one embodiment described herein.

FIG. 6 will now be referred to in conjunction with FIGS. 5D, 5E, and 5F to explain a method in one embodiment in which a receiving device processes content created by a remote extension app, such as the remote extension app executing in conjunction with the messaging app on communication device 200. In operation 301, a communication device can receive a message with content created by an extension app, such as a remote extension app operating in conjunction with a messaging app on a sending device. In addition, the communication device can also receive the metadata which can include a message bubble identifier, session identifier and an extension app identifier and potentially other data such as an optional resource locator and other data (state information) that may be associated with the optional resource locator and the resource locator may also include state information that is encoded into the resource locator. Further information with respect to the use of resource locators and data associated with the resource locators will be provided in conjunction with FIGS. 8, 9A, and 9B. Then in operation 303, the communication device which has received the message in operation 301 processes the content and displays the content in a message bubble which was identified by the message bubble identifier, and the message bubble is displayed within the message transcript. In one embodiment the processing of the content can include decrypting the content and rendering the content for presentation and display within the message bubble. In one embodiment, the content is displayed by the messaging app without assistance from the extension app; in other words, the extension app may not be installed or if installed is not executing on the communication device, and hence the on-screen keyboard is displayed in one embodiment. Then in operation 305 the communication device receives a selection of the message bubble displaying the content created by the remote extension app. In one embodiment, referring to FIG. 5D, the user can tap on the message bubble on a touchscreen or otherwise select (e.g. user uses a stylus on a touchscreen or uses a mouse with a desktop computer, etc.) the message bubble 253 to cause the selection in operation 305. In response to operation 305, the communication device, such as communication device 250 determines in operation 307 whether or not the extension app is installed. This can be performed in one embodiment by examining a list or registration of installed extension apps maintained by the messaging app. In one embodiment, the metadata received in operation 301 includes the app identifier, and the messaging app in operation 307 searches the list to determine whether the identifier is present in the list. If the identifier is not present in the list then the messaging app determines that the extension app is not installed, thereby causing the communication device to perform operation 309 in which the notice 259, shown in FIG. 5F, can be displayed to the user to offer to download and install the app specified by the app identifier which was received as part of the metadata in operation 301. If the user selects the option "yes" then operation 311 is performed in which the messaging app causes the communication device to access the extension app marketplace (such as the extension app marketplace having a user interface shown in FIG. 14B) to retrieve through a download process a copy of the extension app and to cause the extension app to be installed. In one embodiment, operation 311 may be performed entirely in the background so that the messaging app remains the foreground app during the download and install process. FIG. 9C shows an example of a message bubble 471 maintained in a message transcript during the download and install process, where the message bubble includes a progress bar 473 which indicates the progress of the download and install operation while the messaging app remains the foreground application displaying the message bubble 471 in the message transcript of the messaging app. In another embodiment of the operation 311, a sheet that shows a page of information from an extension app marketplace can be displayed over the messaging app (with a portion of the messaging app optionally still displayed), and the sheet can show a "buy" or install or download button, which if selected, can cause the download and installation of the extension app, and the sheet can be dismissed (removed from display) either by selecting a dismiss command or by selecting buy or install or download. After downloading and installing the extension app, processing can proceed to operation 313 in FIG. 6 in which the extension app is launched and the content and other data used or created by the remote extension app is passed (via IPC) to the extension app by the messaging app, and the extension app is displayed in either a compact or expanded view in one embodiment and the content created by the remote extension app is displayed within that view. As shown in FIG. 6, operation 313 also follows operation 307 if operation 307 determines that the extension app is installed. FIG. 5E shows one example of the result of operation 313.

In one embodiment, a messaging app can launch different types of extension apps in different ways depending upon the type of the extension app. For example, one type of extension app can be launched automatically in response to receipt of a message bubble containing content from an extension app having a certain predetermined type. Other extension apps having a different type may only be launched in one embodiment in response to the selection of a message bubble containing content from that extension app or by the selection of an icon representing the extension app in a browsable view, such as browsable view 571. It may be desirable to allow certain extension apps having a certain type to be launched automatically in response to receiving content that is displayed within the message transcript while not automatically launching other types of extension apps. In another alternative embodiment, one or more extension apps can be permitted to execute in the background and can be allowed to update their respective user interfaces that are presented in their respective message bubbles, and when a user selects one of these message bubbles, the extension app can appear in the foreground (e.g., its UI is displayed in place of an on screen keyboard).

In an alternative embodiment, the metadata can include a format or extension identifier such as an identifier of an image format that can be used to determine available extension apps that can process that image format on the receiving device.

Figure 7A:
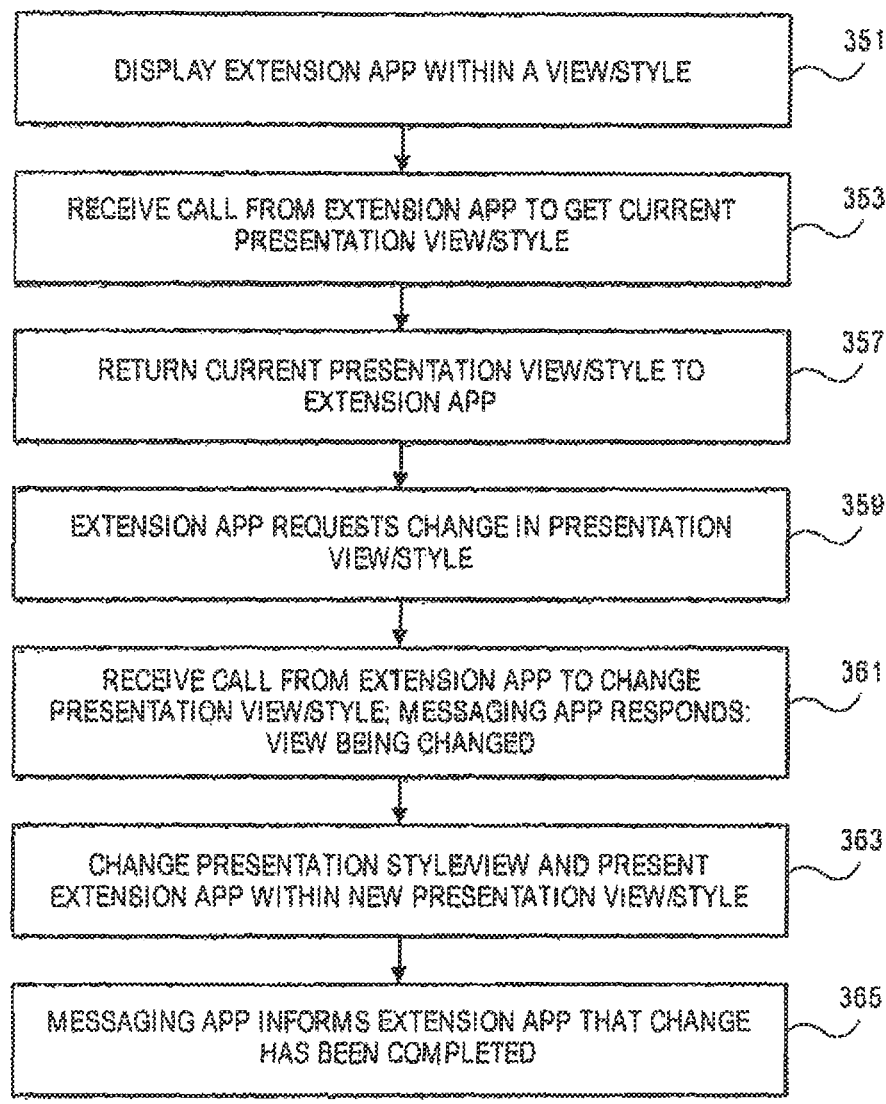
FIG. 7A is a flowchart which depicts a method according to one embodiment in which an extension app can change its view hosted by a messaging app according to one embodiment.
Figure 7B:
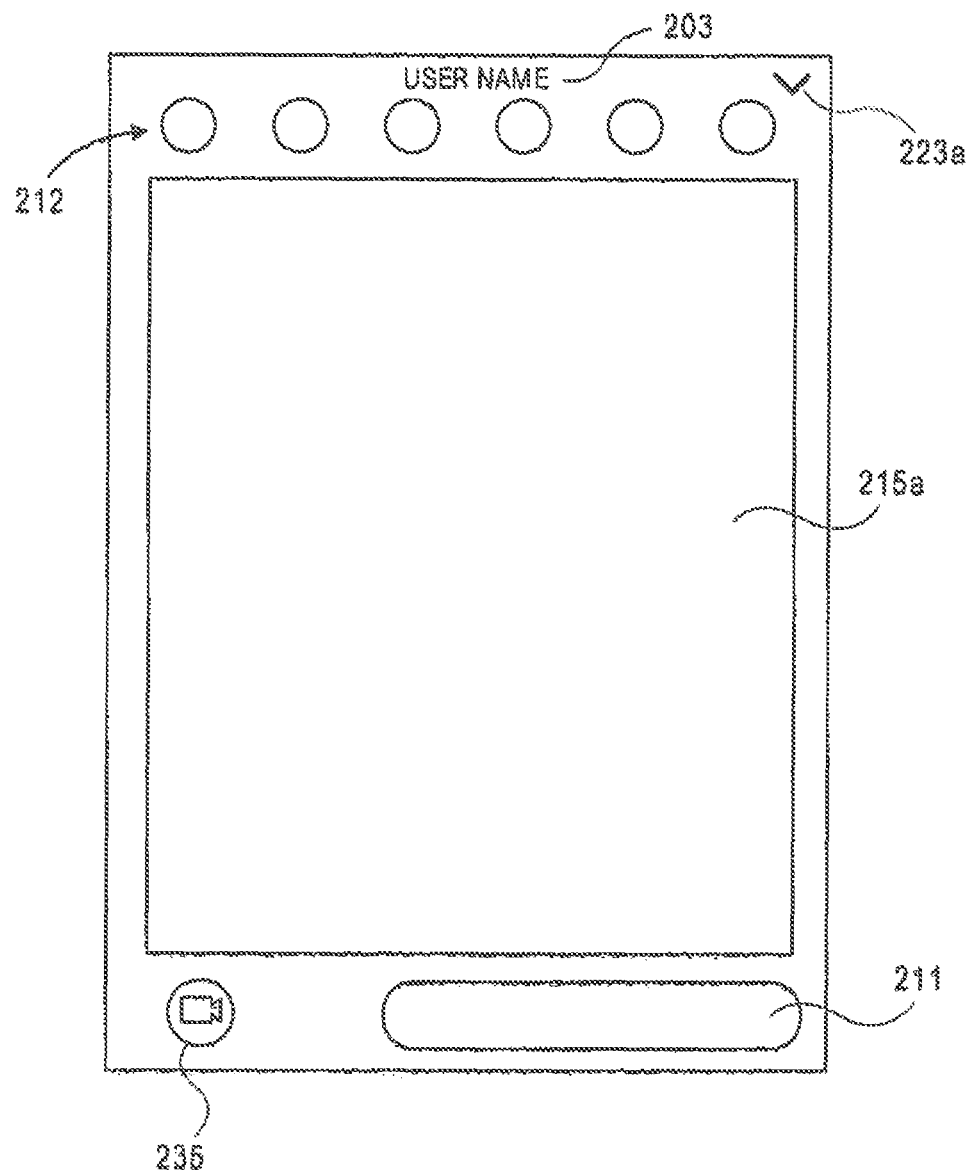
FIG. 7B shows an example of a user interface of an extension app in an expanded view according to one embodiment.

FIGS. 7A and 7B illustrate another aspect of the embodiments described herein in which the extension app can cause a view to be changed by sending communications to the messaging app to cause that change. In one embodiment, an application programming interface (API) can be provided between the extension app and the messaging app to allow the extension app to make calls to that API to change its view within the messaging app which hosts the view of the extension app. In one embodiment, an extension app can have at least two different views which can include a compact view and an expanded view. In one embodiment, the compact view may be a view which takes the place of the on-screen keyboard of the messaging app while the message transcript remains displayed in the user interface of the messaging app. In the expanded view, the message transcript is no longer displayed and the on-screen keyboard is not displayed but certain other components of the user interface of the messaging app, such as text entry region 211 and a camera activation icon 235 are displayed. FIG. 7B shows an example of an expanded view in which the drawing canvas 215A occupies most of the space of the touch screen. As shown in FIG. 7B, the compact view icon 223A can be selected by the user to cause the system to change from the expanded view shown in FIG. 7B back to the compact view, such as the view shown in FIG. 5A.

The method shown in FIG. 7A is one embodiment showing how the view can change, and it will be appreciated that in alternative embodiments, the sequence of operations may be performed in a different order and there may be omitted steps or intervening steps or additional steps.

In operation 351 of FIG. 7A, the extension app is displayed by the messaging app with a particular view or style. In operation 353, the extension app can make a call to the messaging app to get the current presentation view/style of the extension app. In operation 357, the messaging app can provide a return for the call from operation 353, and that return can indicate the current presentation view/style of the extension app. In response to that current presentation received in operation 357, the extension app can request a change in the presentation view/style by providing a call to the messaging app to cause that change to occur, and that call is received in operation 361. The messaging app in one embodiment can initially respond to this call with an acknowledgement that the view is being changed or will be changed. In response to the call, in operation 363, the messaging app changes the presentation style/view and displays the extension app within the requested view presentation view/style and in operation 365 the messaging app informs the extension app that the change of view has been completed. Referring back to FIG. 7B, if the user selects the compact view icon 223A, this can cause a call from the extension app to the messaging app to change the view of the extension app within the user interface of the messaging app.

Figure 8:
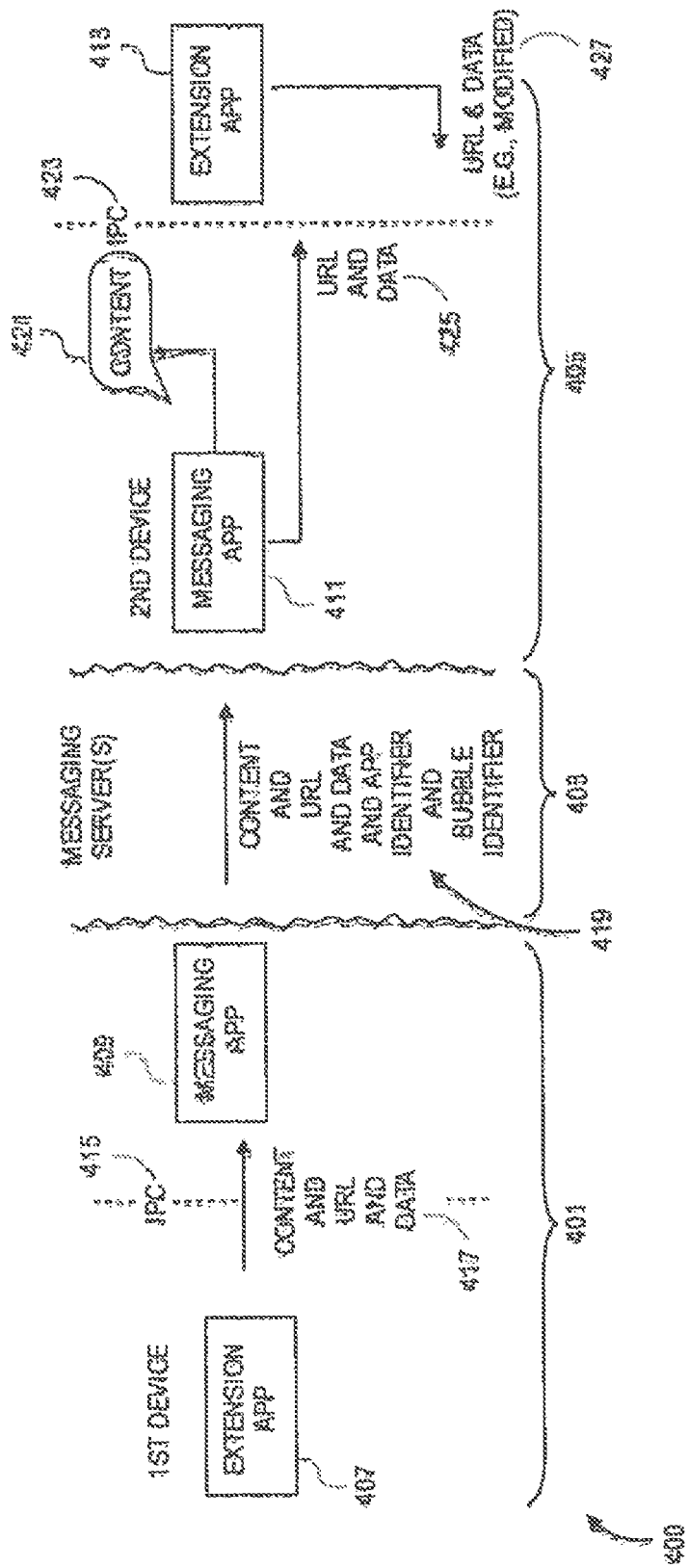
FIG. 8 shows an example according to one embodiment in which extension apps on two or more devices can interact with each other through the messaging apps on each device.
Figure 9A:
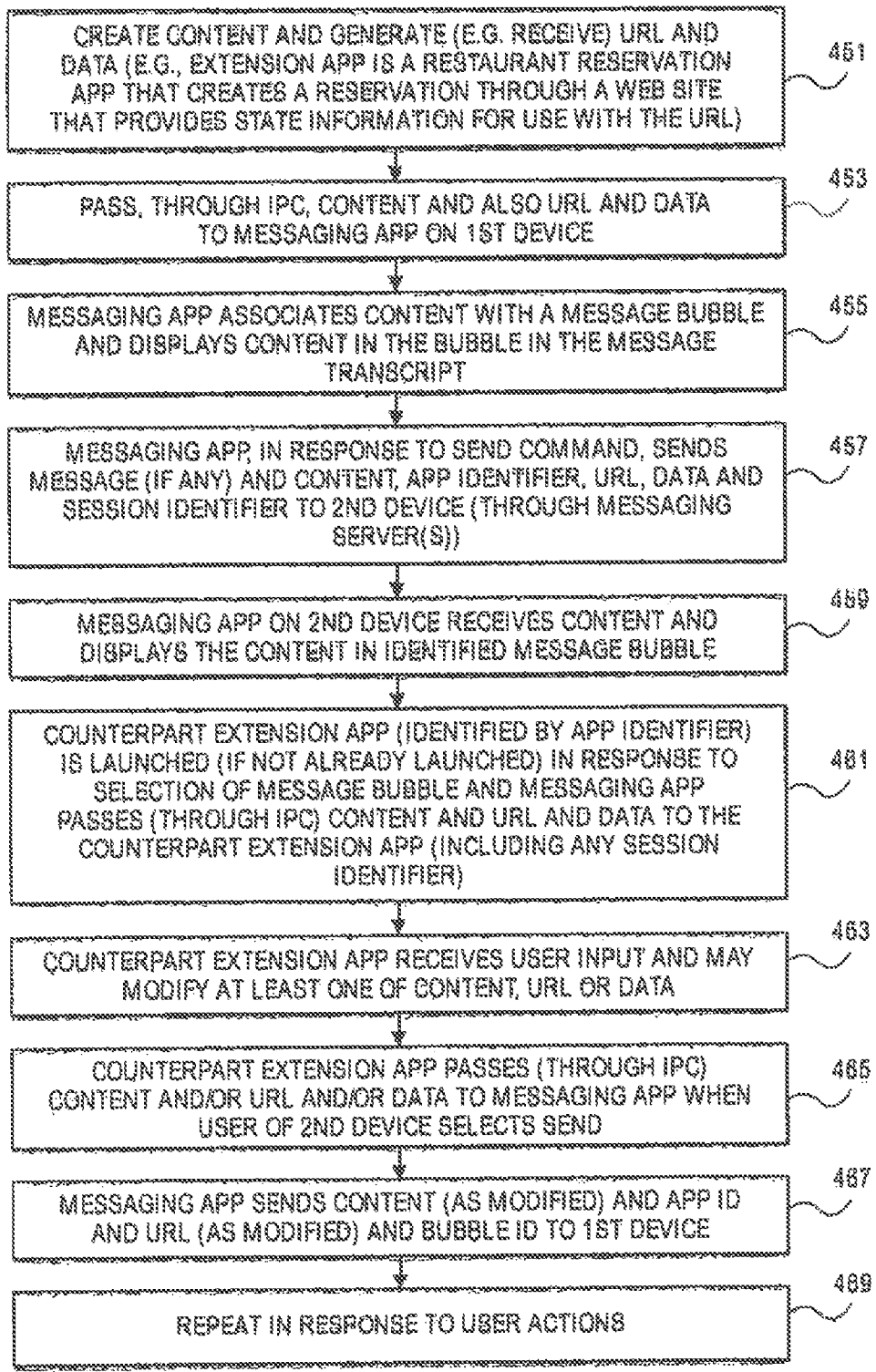
FIG. 9A is a flowchart which illustrates a method according to one or more embodiments described herein for allowing the interaction between extension apps on different devices.
Figure 9B:
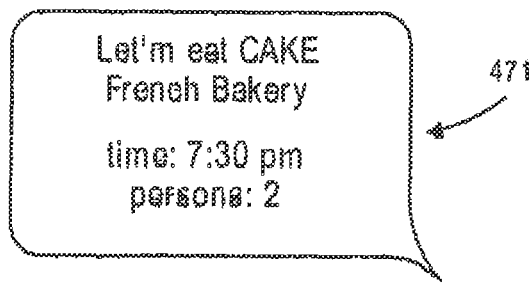
FIG. 9B shows an example of a message bubble in a user interface which can result from the method shown in FIG. 9A when two or more extension apps interact in a session.
Figure 9C:
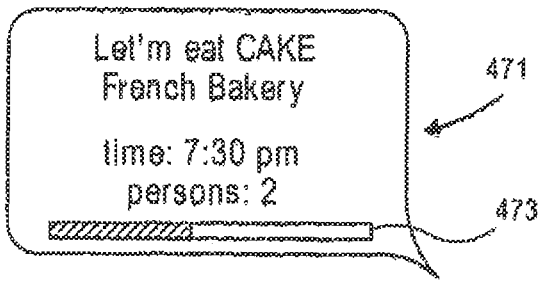
FIG. 9C shows an example of a message bubble according to one embodiment in which a download and install for a required extension app occurs while the messaging app remains in the foreground.

FIGS. 8, 9A, 9B, and 9C will now be described relative to another aspect of the embodiments presented herein. In one aspect of this embodiment, an extension app and a counterpart extension app on another device can engage in a communication session and exchange information back and forth in their communication session, and all of this occurs within the context of a message transcript maintained by the two messaging apps which interface between the two extension apps as shown in FIG. 8. In one embodiment, plug-ins for a messaging app can also operate in a similar way and exchange information between the plug-ins through two messaging apps that are in a session. The messaging system 400 shown in FIG. 8 includes at least two clients devices, client device 401 and client device 405 and also includes a set of one or more messaging servers 403. The client devices 401 and 405 can be similar to the client devices 53 and 54 in FIG. 2, and the set of one or more messaging servers 403 can be similar to the set of messaging servers 51 shown in FIG. 2. Each client device can include an installed copy of a particular extension app (such as, for example, an extension app for making reservations at restaurants), and the extension app on each device can be used to create content (e.g. text, images, audio, video, etc.), and this content is passed, through an interprocess communication framework to the messaging app on the device for a specific message, which can be referred to as a message bubble, in the message transcript on the particular client device. The message app receives the content (and optionally other data from the extension app, including for example an identifier of the extension app, a resource locator and optionally metadata for use by a counterpart or remote extension app on the other device, etc.) and displays the displayable content (such as an image of a restaurant provided by the extension app which is a restaurant reservation app such as "Open Table" in the message bubble in the message transcript). In effect, the messaging app hosts a view within the messaging app and the content of that view is provided by the extension app. The resource locator and metadata in one embodiment are opaque to the messaging app (e.g. cannot be recognized by the messaging app) but can be used by the extension apps on each device to maintain state information for the session between the extension apps, and the messaging apps on each device act as a communication mechanism between the extension apps by passing the resource locator and metadata between the extension apps. In one embodiment, state information about the session may be encoded in the resource locator or may be provided in the metadata or may in both. In one embodiment, the content created from a session on each device is displayed within the same single message bubble (identified by a session identifier that can be maintained by the messaging app) in the message transcripts, and each time the content changes (based on changes from either device), the updated content continues to be displayed within a single message bubble in the message transcript and any prior message bubbles that displayed content in the session can be converted into breadcrumbs, and these prior message bubbles will also include the same session identifier as the new, updated message bubble. The operations and functions of the components shown in FIG. 8 will now be described while referring to FIG. 9A which shows a method of operating the messaging system 400 in one embodiment.

In operation 451 of FIG. 9A an extension app, such as the extension app 407 can create content and generate a resource locator and data (or can modify existing content, resource locator or data). The extension app can be similar to the extension app 83 and is executing in one embodiment in one process while the messaging app, which can be similar to the messaging app 76, is executing in another process and communication between the processes occurs through an IPC, such as the IPC 81 which can be a software framework or library for providing interprocess communication between two distinct processes. The extension app 407 can be, for example, a restaurant reservation app that creates a reservation through a website that can provide a state information for use with the resource locator (or the state information can be encoded into the resource locator). In one embodiment, the data provided with the resource locator can be a state information provided from the website, and the state information can include information about the particular restaurant and the time of the reservation and the number of people in the reservation. The extension app 407 can present, in either a compact view or expanded view the user interface for making the restaurant reservation through the website while the remainder of the messaging app is displayed, including for example the message transcript. Thus the user of the extension app 407 can see the context of the conversation in the message transcript while interacting with the extension app and the website (through the extension app) to create a restaurant reservation. In one embodiment, the user may be able to browse through various restaurants (within the restaurant reservation app) and search for restaurants. After the user of the extension app 407 has selected a restaurant and entered a reservation, the extension app 407 can pass, through the IPC 415, content and also the resource locator and data 417 shown in FIG. 8 for the messaging app on device 401. This is shown as operation 453 in FIG. 9A. In operation 455, the messaging app 409 associates the content received from the extension app 407 with the message bubble and displays content in the bubble in the message transcript in the user interface of the messaging app 409. Then in operation 457, the messaging app 409, in response to a send command received from the user, sends a message (if any) and content received from the extension app 407, and an app identifier which identifies the app 407 (and optionally an icon of the app 407), and the resource locator and the data (if any) and a session identifier to the second device through the one or more messaging servers 403 which pass the communication 419 to the second device 405 (also referred to as client device 405). In one embodiment, the operations 453 and 455 can occur as part of operation 457 in response to the messaging app receiving the selection of the send command. The icon of the app 407 can be displayed on the message bubble on the receiving device even if the counterpart extension app is not installed; see for example, icon 87 in FIG. 3B. In operation 459 shown in FIG. 9A, the messaging app 411 on the client device 405 receives the content from the one or more messaging servers 403 and displays the content in the identified message bubble 421 within the message transcript provided by the user interface of the messaging app 411. FIG. 9B shows a more detailed example of such a message bubble 471 having content created by a restaurant reservation extension app in one embodiment. In the example shown in FIG. 9B, the content includes the name of the restaurant, the time of the reservation and the number of persons of the reservation. In one embodiment, this content can be displayed by the messaging app without requiring that the extension app 413 be launched. In one embodiment, the extension app 413 is not launched until the user of client device 405 selects the message bubble 421, thereby indicating to the client device that the user of the client device 405 intends to interact with the content in the message bubble 421. In an alternative embodiment, the extension app 413 can be launched upon receipt by the messaging app 411 of the content but remain in the background and be ready for execution when the user of client device 405 enters a command to cause the extension app to appear. In operation 461, the extension app 413, which is identified by the app identifier provided in the communication 419 is launched, if not already launched, in response to selection of message bubble 421 and the messaging app 411 passes, through IPC 423 the content associated with message bubble 421 and resource locator and data 425 to the messaging app 413. In one embodiment, the extension app 413 is the counterpart extension app that is the same extension app as extension app 407, while in another embodiment they can be merely compatible in that they can process the same type of content.

At this point, the extension app 413 can receive user input by the user of client device 405 and can modify one or more of the content, the resource locator or the data. For example, the user of client device 405 can cause the extension app 413 to access one or more websites to make a modified restaurant reservation by modifying the time, the number of people, the particular restaurant, etc. In one embodiment, the extension app 413, and also the extension app 407 can interact directly (but separately and independently) with the web server by sending the resource locator and the data to the web server and receiving responses from the web server which may include modified data or modified resource locators, or new data and/or new resource locators etc. In one embodiment, the web server can store data for use during the session, and this stored data can include information for some or all of the state information that can also be maintained by the two extension apps in the session. Again, if the extension app 413 is presented for display in a compact view, then the user of the device 405 can interact with the extension app 413 to make the restaurant reservation while the context and conversation of the chat or messaging session is shown in the message transcript of the messaging app 411. The user of the client device 405 can scroll through the message transcript while continuing to look at and interact with the extension app 413. Thus, the extension app 413 can, in operation 463 receive user input and may modify at least one of the content, the resource locator or data, and then can pass, in operation 465 the resource locator and data 427 (which may be modified or new) to the messaging app 411. In turn, the messaging app 411 in operation 467 can send the content, which may be modified, and the app identifier and the resource locator (which may be modified) and data (which may be modified) and the bubble ID back to the client device 401. As shown in operation 469, this process can repeat over time as the two users work on setting up a restaurant reservation in the example provided herein.

It will be appreciated that many different types of extension apps can provide a collaborative environment between the users of client devices 401 and 405 to exchange information and collaborate together and that restaurant reservation is one such type. Thus, it will be appreciated that the restaurant reservation example that is described relative to FIGS. 8 and 9A is merely an example of one such type of extension app which can provide a collaborative environment in the context of the user interface of a messaging app. Examples of other types of extension apps which can provide a similar collaborative environment include, for example: sticker extension apps; imaging apps; drawing apps; content creation apps; games; music creation apps; content consumption apps; polling apps; map apps; etc.

The collaborative environment shown in FIG. 8 and described relative to FIG. 9A can utilize breadcrumbs in one or more embodiments, and each of the breadcrumbs can be identified by a session identifier. A breadcrumb represents a converted message bubble and is identified by a session identifier that is shared with other message bubbles in the session. Each prior message bubble that is identified with the same session identifier as a new message bubble can be converted in one embodiment into a breadcrumb which can appear differently than the original content shown in the message transcript. As each new message bubble in the session arrives or is added to the message transcript, the prior message bubble identified with the same session identifier can be converted into a breadcrumb in one embodiment, and this is shown in the message transcripts shown in FIGS. 9D, 9E, 9F, 9G, and 9H. FIGS. 9D and 9H show a message transcript 510 on Joe's device, and FIGS. 9E, 9F, and 9G show a message transcript 17 on Lester's device. Message transcript 510 shows Lester's user name 511, and message transcript 517 shows Joe's user name 518. In the example shown in FIGS. 9D, 9E, 9F, 9G, and 9H, Lester and Joe are engaged in a text messaging conversation and are each using an extension app, such as an image creation app or other extension apps. For example, Lester can be using extension app 407 shown in FIG. 8 and Joe can be using extension app 413 shown in FIG. 8. Lester's device can be using messaging app 409 while Joe's device can be using messaging app 411. Referring back to FIG. 9D, it can be seen that the message transcript 510 includes message bubble 512 and message bubble 513 which indicate the content of the conversation within the message transcript 510. In addition, Joe has used the extension app 413 to create content 515 which is appended to message bubble 514. For example, Joe may have entered text as a text message and also created content using the extension app 413 and then cause both the text shown within message bubble 514 and the content 515 (which is in one embodiment associated with or part of message bubble 514) to be sent to Lester's device. The right side of the message transcript 510 shows messages that were sent by Joe while the left side of the message transcript 510 shows messages that were received from Lester. Referring now to FIG. 9E, it can be seen that message bubble 513 is now on the right side of the message transcript 517 while message bubble 514 and content 515 are on the left side of the message transcript 517 on Lester's device. Hence, Lester's device has received the text message within message bubble 514 and has also received the content 515 generated by the extension app on Joe's device. Lester can then tap on the content 515 to cause the launching of the corresponding or counterpart extension app on Lester's device. The content 515 is associated with a session identifier which is maintained for the extension app on Lester's device. For example, at this point in the process, operation 461 shown in FIG. 9A can be performed on Lester's device as a result of the user selecting the content 515 which can be displayed within a message bubble in one embodiment. Lester can then use the extension app on Lester's device to create modified content or new content and send that modified or new content back to Joe. In FIG. 9F, it can be seen that Lester has created modified or new content 521 which is shown within a staging area 519 which shows text and other content that is ready to be sent and will be sent in response to selection by a user of a send command, such as the send button 523 shown in FIG. 9F. When Lester selects the send command with the content shown in the staging area 519, this causes the text message 520 and the new or modified content 521 to be sent to Joe, and this can be seen in FIG. 9G in which message bubble 520A shows the text message 520 on the right side of the message transcript 517 which also shows the content 521 (which is in one embodiment associated with or part of message bubble 520A) which was modified or created as new by Lester using the extension app 407 on Lester's device.

It can be seen from FIG. 9G that content 515 has now been converted into a breadcrumb 515A. This conversion in one embodiment can be performed by the messaging app or alternatively by the extension app. In one embodiment, the extension app can provide the text which appears within the breadcrumb 515A, and the messaging app will use the session identifier to identify the one or more message bubbles that will be converted into a breadcrumb and this will cause the conversion of content 515 into the breadcrumb 515A and display the breadcrumb next to the associated message bubble 514 without converting a text message that message bubble 514 into a breadcrumb in one embodiment. Thus, FIG. 9G shows how a session identifier associated with prior message bubbles or content created by an extension app can be used to convert the prior message bubble(s) into a breadcrumb on a sending device. FIG. 9H shows how the conversion is displayed in one embodiment on the receiving device. In the figure shown in FIG. 9H, the message bubble 520A is shown on the left side of the message transcript 510 along with the new or modified content from extension app 403 from Lester's device. The content 515 on Joe's device has been converted into a breadcrumb 515A on the right side of the message transcript and is displayed adjacent to the message bubble 514 which accompanied the content 515 when the content 515 was originally sent.

If the receiving device, such as client device 405 in operation 459 is capable of installing and using the extension app (identified by the app identifier provided in communication 419) but that the extension app is not installed on the receiving device, the receiving device can, within the user interface of the messaging app offer to download and install the extension app (again specified by the app identifier in communication 419, on the receiving device). FIG. 9C shows an example in which the content from extension 407 can be displayed on the client device 405 in a message bubble 471 and the client device 405 is in the process of downloading and installing the extension app identified by the app identifier in communication 419. In the example shown in FIG. 9C, the content is displayed within the message bubble 471 while the extension app 413 is being installed. In one embodiment, a progress bar 473 (or alternatively a progress circle) can be shown within the message bubble 471 during the installation process. In one embodiment, the downloading and installation process can be performed in the background while the messaging app remains the foreground application. If the receiving device is not capable of installing or using the extension app, then the resource locator and the metadata can be passed in one embodiment to a web browser on the receiving device, and the web browser can become the foreground app and allow for the user interaction with the web page referred to by the resource locator.

Figure 10:
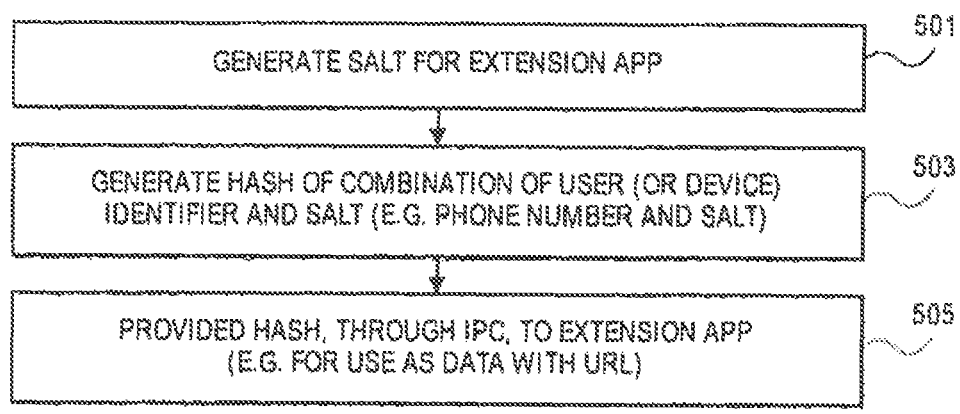
FIG. 10 is a flowchart which illustrates a method according to one embodiment described herein.

In some embodiments, it may be desirable to provide an identifier of each user to each extension app executing on a client device, particularly in the case of a collaborative environment in which two or more users are interacting through the messaging apps and the extension apps. FIG. 10 shows an example of a method to provide an identifier for each extension app without causing a loss of the user's privacy. The method shown in FIG. 10 can be performed by each messaging app on each client device. In one embodiment, the method can be performed in response to a call from an extension app to an application programming interface (API) which can allow the extension app to request an identifier of the local user. In one embodiment, the identifier can be the local user's email address or phone number or other identifier used by the messaging system. The identifier provided to the extension app is an obfuscated identifier created, in one embodiment, by the method shown in FIG. 10. In operation 501, the messaging app can generate, in response to a call from the extension app, a salt for the particular extension app. In one embodiment, the salt can be a random number which is associated with that particular extension app. Then in operation 503, the messaging app can generate a hash (such as a SHA-1 hash) of a combination of a user or device identifier and the salt. For example, the user identifier may be the phone number or email address of the user and that phone number or email address is combined with the salt and then the hash is created for that combination in operation 503. Then in operation 505, the hash is provided, through the IPC, to the extension app, and that hash value can be used as data with the resource locator which can then be sent to the other extension app to identify the user that has made changes or has created a content. In another embodiment, the messaging app can obfuscate the identifier by maintaining a mapping of the identifier and a randomly generated unique identifier for each extension app. In other words, for a given extension app, the messaging app can generate a random (and unique) identifier for the extension app and associate (e.g., map) that random identifier with the identifier of the user (e.g. local user's email address or phone number or other identifier used by the messaging system). This random identifier for the given extension app can be provided to the extension app, but the identifier is not provided to the extension app. Another extension app would receive a different, randomly generated identifier. This extension app specific identifier can then be provided to a counterpart extension app on another device so that the two extension apps can keep track of which users performed which actions in the context of a session or other collaborative environment.

Figure 11:
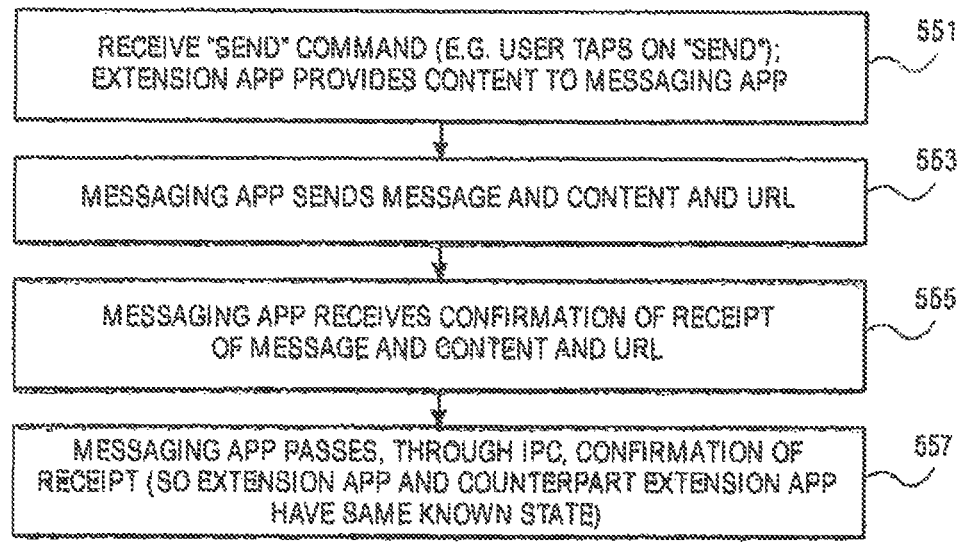
FIG. 11 is a flowchart which illustrates a method according to one embodiment described herein.

In one embodiment, the messaging systems described herein can provide confirmation of receipt of messages to one or more extension apps, and this may be useful in certain cases in which the extension app needs to be assured that the remote extension app has the same known state as the local extension app. FIG. 11 shows an example of a method for providing confirmation of receipt. In operation 551, the messaging app receives the "send" command from a user and in response the local extension app provides the content to the messaging app. In turn, in operation 553, the messaging app sends the message and message bubble identifier and content and resource locator (if any) through the one or more messaging servers to a receiving device which also includes a message app. At some point, the messaging app on the local device in operation 555 receives a confirmation of receipt of the message and content and optional resource locator, and then can pass, in operation 557, through the IPC the confirmation of receipt to the local extension app so that the local extension app knows that the remote extension app has the same known state when the extension app provided its content for transmission to the remote extension app.

Figure 12:
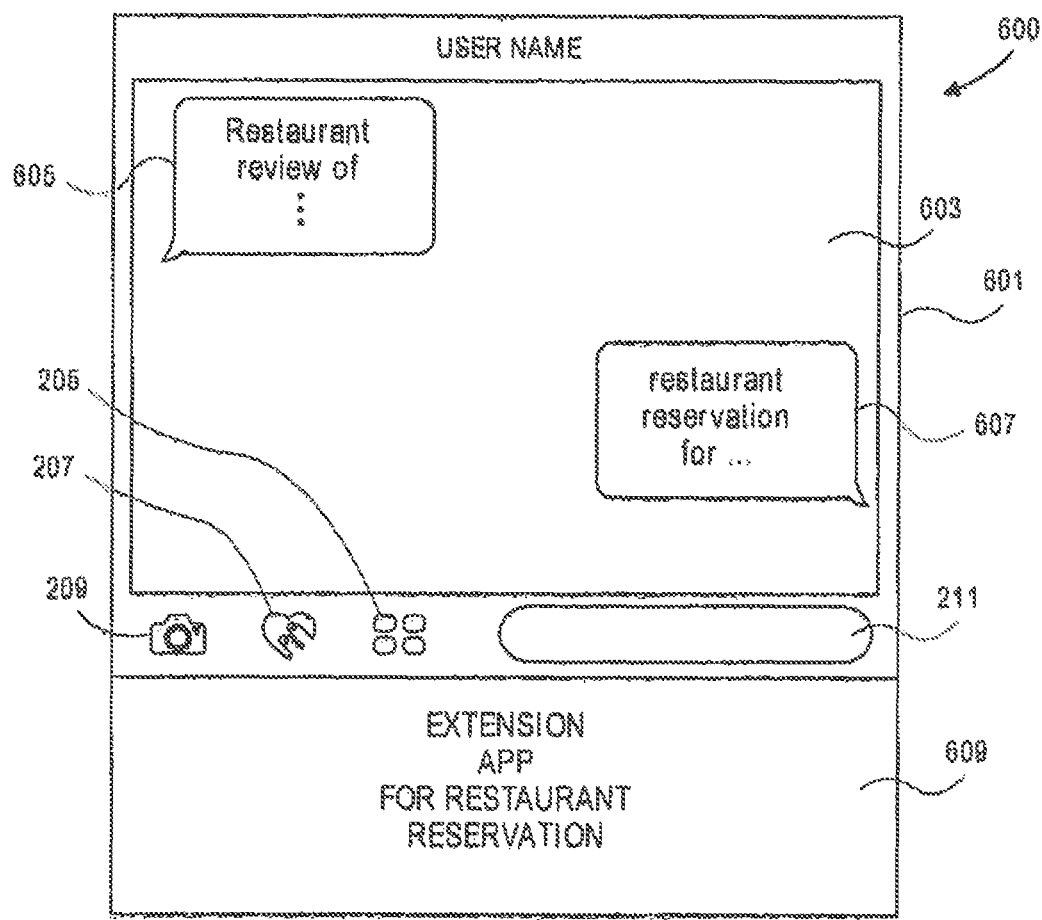
FIG. 12 shows a user interface of a messaging app in which content from two or more different extension apps is presented within the same message transcript provided by the messaging app.

FIG. 12 shows another aspect to the embodiments described herein, and that aspect relates to the presentation of multiple message bubbles within a message transcript where different message bubbles have content created by different extension apps, and at least one of which may be executing (and have its content displayed in a compact view) while the message transcript of the user interface of the messaging app is also displayed. FIG. 12 shows an example of such an aspect. The communication device 600 in this embodiment includes a touch screen 601 which displays a message transcript 603 which includes two message bubbles 605 and 607. In addition, the messaging app presents a compact view 609 of an extension app, which in this case is an extension app for a restaurant reservation. In the example shown in FIG. 12, the extension app for a restaurant reservation has been used to send a message showing the content of a restaurant reservation, which is depicted as message bubble 607. This may have occurred as a result of receiving a message from another user who uses another communication device which provides the content of a restaurant review from another extension app. In the example shown in FIG. 12, message bubble 605 shows the content created by a remote extension app for providing restaurant reviews which is different than the extension app for making a restaurant reservation. In one embodiment, both extension apps may be executing on both communication devices that are part of the messaging session or chat.

Figure 13A:
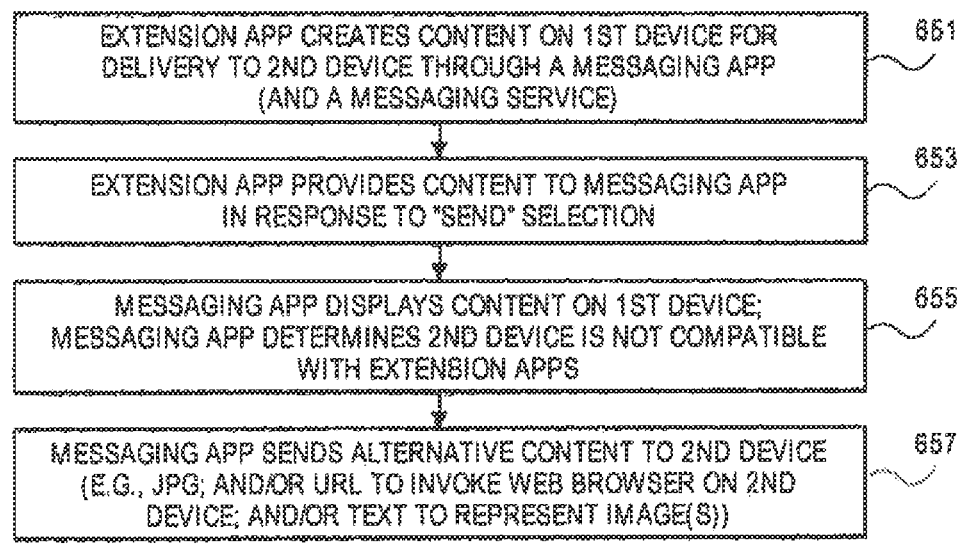
FIG. 13A is a flowchart which shows a method according to one embodiment for providing backward compatibility for older devices or older messaging systems.
Figure 13B:
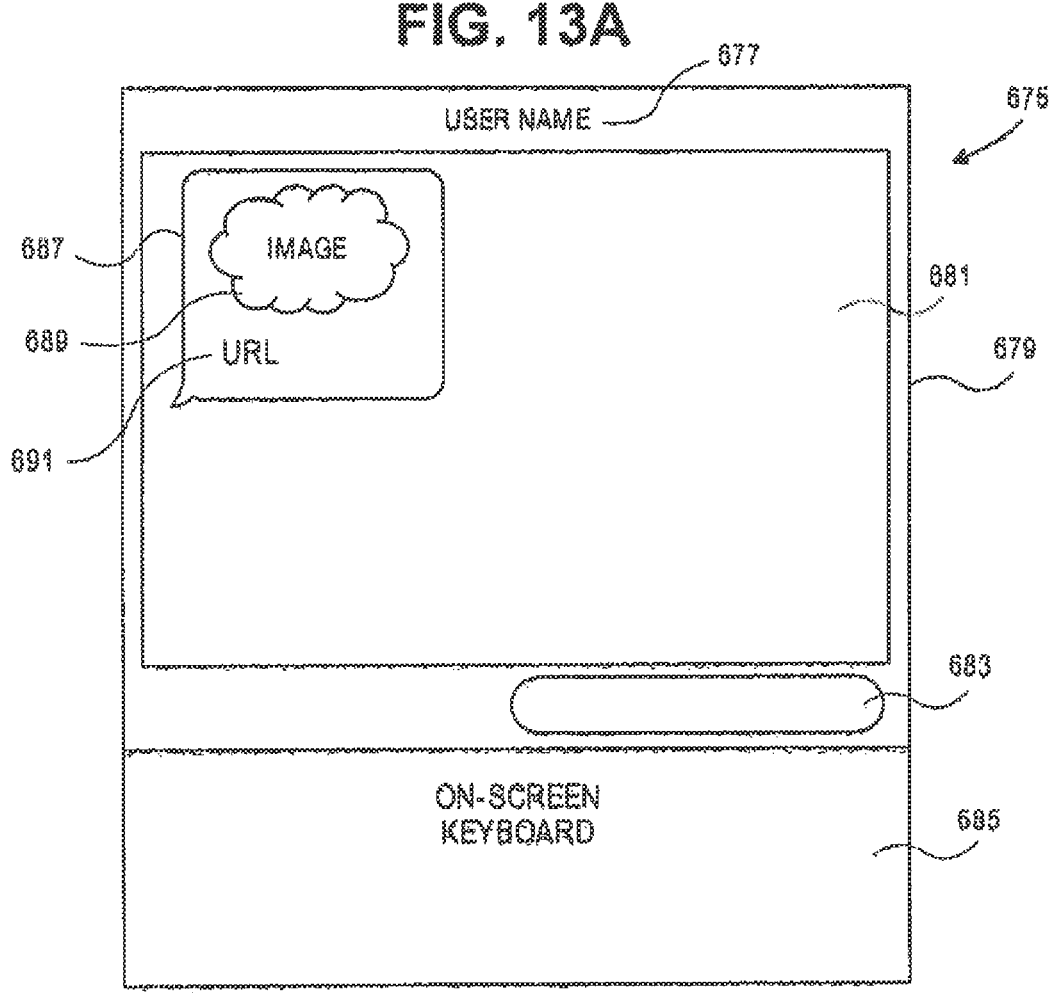
FIG. 13B shows an example of a user interface in which backward compatibility has been provided within a messaging app.

Another aspect of the embodiments described herein relate to backward compatibility, and that aspect is shown in FIGS. 13A and 13B. Certain older devices may not be compatible with the extension app architecture described herein or may not use this architecture or may not even be smartphones. In one embodiment, a client device which is sending the message may be able to provide alternative content, either automatically or based upon a determination that the receiving device is not compatible with extension app. A method for providing backward compatibility is shown in FIG. 13A. In operation 651, an extension app on a sending device creates content on the sending device (first device) for delivery to a second device through a messaging app and a messaging service. This can be similar to operation 451 in FIG. 9A. The content created in operation 651 can then be passed through an interprocess communication to the messaging app in operation 653 in response to the messaging app receiving the user's "send" selection. Then in operation 655, the messaging app can display the content on the first device and also determine that the second device is not compatible with extension apps. In one embodiment, this can be determined as a result of receiving information about the receiving device (second device) from one or more messaging servers, such as the one or more messaging servers 51 shown in FIG. 2 which can maintain information about the state of each device, such as the version of the operating system of the device or the type of device, etc. As a result of determining that the second device is not compatible with extension apps, the messaging app can in operation 657 send alternative content to the second device, and FIG. 13B provides an example of this alternative content.

The communication device 675 shown in FIG. 13B may be, for example, an older smartphone which uses an older operating system that is not compatible with extension apps described herein. Nevertheless, the communication device 675 includes a touch screen 679 and a text entry region 683 and an on-screen keyboard 685 that provide functionality of a messaging app which also displays a message transcript 681 which includes a message bubble 687. The message bubble 687 contains the alternative content provided by a sending message app on a remote device. In this case the content includes an image 689 and a resource locator 691 which may be user selectable to cause the display of a web page which the resource locator 691 refers to. In other words, the resource locator 691 may be user selectable to invoke a web browser on the communication device 675 to allow the user of the communication device 675 to interact through a web browser with the web page which may have the same affect in certain instances as an extension app interacting with the web site.

Another aspect of the embodiments described herein relate to a service, such as an app marketplace that can provide a plurality of different extension apps for use within a messaging app according to the one or more embodiments described herein. The service or app marketplace can present browsable views of the plurality of different extension apps and messaging app plug-ins and provide information about those various extension apps and provide for downloading of those extension apps to a client device to allow the client device to install one or more extension apps. FIG. 14A shows an example of a method for using such a service or app marketplace and FIG. 14B shows an example of a user interface for a messaging extension app marketplace. The app marketplace shown in FIG. 14B may be invoked in one embodiment from a browsable view of installed extension apps within the user interface of the messaging app on a client device. For example, the selection of icon 167 shown in FIG. 4B may cause the presentation of the messaging extension app marketplace shown in FIG. 14B. The user can then browse through the one or more collections of messaging extension apps and select one or more extension apps which may be free or may be purchased. In the example shown in FIG. 14B, the messaging extension app marketplace 725 can include a navigation bar 729 and a browsable view of one or more messaging extension apps, such as apps 726, 728, and 731 displayed on the touch screen 727. The user can browse through the apps by swiping, in one embodiment, the user's finger across the touch screen or by the use of a navigation bar 729. The user can then select the download and install one or more of the extension apps, and as a result the messaging app on the user's client device can add an icon representing the newly installed extension app into the browsable view of installed extension apps, such as the browsable view 157 shown in FIG. 4B. In addition, the messaging app can add the installed extension app into a list of installed extension apps along with the identifier of the app ("app identifier") provided by the app marketplace. While the user's use of the app marketplace shown in FIG. 14B is one way of installing extension apps, another way is shown in FIG. 14A in which the installation process begins as a result of the user interacting with a message in the message transcript of a messaging app.

Referring now to FIG. 14A, a messaging app in operation 701 can receive content (and an optional resource locator and data) created by an extension app on a remote device, such as a first device, and can also receive an app identifier of the extension app on the remote device. In one embodiment, the app identifier can be the same identifier provided by the app marketplace when the extension app was installed on the first device or can be a different identifier that is associated with the app store's identifier. Then in operation 703, the messaging app on the second device can display the content in a message bubble and can retain the resource locator and data if provided. At this point, the messaging app in this embodiment does not attempt to launch an extension app which in fact is not installed on the second device at this point in time. Then in operation 705, the messaging app receives a selection, such as a tap, of the message bubble containing the content provided by the extension app from the first device, and the messaging app determines that the extension app (as identified by the received app identifier) is not installed on the second device. At this point, as shown in operation 707 of FIG. 14A, the messaging app offers to download and install the extension app on the second device and the user can select to install that extension app which was identified by the app identifier received in operation 701. In some instances, the user may need to purchase the extension app before it can be downloaded and installed. The offer to download and install may be presented in a notice, such as the notice 259 shown in FIG. 5F, and this notice may include a selectable option to cause the downloading and the installing of the extension app for the selected message bubble. Then in operation 709, the second device downloads and installs the extension app and can launch the newly installed extension app. In one embodiment, the download and install can occur in the background while the messaging app remains the foreground. In one embodiment, the progress of the download and install can be shown in a progress bar, such as the progress bar 473 shown within the selected message bubble. After operation 709 is completed, then the newly installed extension app can be used on the second device and, the messaging app can provide, in operation 711, the content and optional resource locator and data to the extension app on the second device within the view hosted by messaging app.

In one embodiment, the messaging app may cause the automatic updating of extension apps which have been installed. In another embodiment, the messaging app may provide alerts or notices to the user that certain extension apps are in need of being updated and the notifications about these updates can be received from an extension app marketplace in one embodiment. This can allow a user to selectively decide whether or not to update specific messaging apps.

Another aspect of the embodiments describe herein relate to sticker extension apps, and FIGS. 15, 16A, 16B, and 16C show examples of this aspect. Sticker extension apps are apps that run as extensions for a messaging app such as a messaging app 76 shown in FIG. 3A and provide images to the messaging app that are associated with a message bubble in a message transcript of the messaging app. A sticker app in one embodiment can be purchased or otherwise obtained from a messaging extension store (e.g. see FIG. 14B), and the purchased sticker app can include a set of stickers. In one embodiment, the file size of the images are constrained to be less than a predetermined amount of data. In one embodiment, the user can create the image using the sticker extension app within a view of the messaging app and then drag the image from the sticker extension app's view in the message app onto a message bubble in the transcript provided by the messaging app. In one embodiment, after dragging the image onto the message bubble, the user can also scale (e.g. enlarge or shrink) and rotate the sticker image on the selected message bubble. In one embodiment, the user can also apply a sticker to a message bubble which was staged to be sent but which has not been sent. In one embodiment, the sending device sends an encrypted image file to a messaging server and receives a download token (and an associated time-to-live (TTL) value) wherein the token represents the encrypted image file. The image file in one embodiment is encrypted on a per sender basis as described herein, and thus the messaging servers can store multiple instances of the same sticker, each encrypted with a different key of different sending devices and each having a time-to-live value which can be refreshed by the appropriate sending device when it sends the download token (previously obtained from the server) to the server for a subsequent message. In one embodiment, the sticker can be animated.

When a sending device first sends a sticker image which can be encrypted to the one or more messaging servers, it receives the download token and a time-to-live value. The messaging system 800 shown in FIG. 15 can be similar to the messaging system 50 shown in FIG. 2. In particular, the set of messaging servers 801 can be similar to the messaging servers 51 and the sending device 803 and the receiving device 805 may be similar to client devices 53 and 54. Moreover, in one embodiment, the sending device 803 and the receiving device 805 can use the architecture shown in FIG. 3A in which a messaging app 76 operates in conjunction with the separate extension app through an IPC as shown in FIG. 3A. When the sending device 803 first sends 811 a sticker image, (which can be encrypted) along with a message, which can be encrypted, to the set of one or more messaging servers 801, the sending device 803 receives 812 a download token and a TTL value which indicates when the encrypted sticker image is scheduled to expire (at the same time) on both the messaging server 801 and the sending device 803. If the sending device 803 sends 819 the sticker (same sticker) again in a message to the same or different receiving device while the TTL value has not expired, the sending device 803 does not upload the sticker image again but rather sends 819 the download token to the one or more message servers 801 which also causes the time-to-live value of the server 801 to be refreshed (and also causes the TTL value stored at the sending device 803 to be refreshed). If the time-to-live value has expired, the sending device 803 will upload again the encrypted sticker image (which can be encrypted with a different key) and will receive another download token from the set of one or more messaging servers 801. The set of one or more servers 801 can maintain an encrypted sticker's database 802 which has, for each encrypted sticker, the corresponding token and a corresponding time-to-live value. In particular, an encrypted sticker 1 can have a corresponding token value of token 1 and a corresponding time-to-live value of TTL1 shown in row 821 of the database 802. Similarly, another encrypted sticker image can have for its row 823 in the database 802 a copy of the encrypted sticker 2 and its corresponding token 2 and TTL2 value in row 823. In an alternative embodiment, sticker 1 and sticker 2 can be encrypted images for the same sticker image but for different receivers (but from the same sending device) and are encrypted with different keys and thus are stored separately and in separate rows of the database. While the embodiments described relative to FIG. 15 use TTL values for stickers, it will be appreciated that other objects sent from a messaging app can also use TTL values in the same way, and these other objects can include images, documents, executable files (e.g. games), etc.

Figure 15:
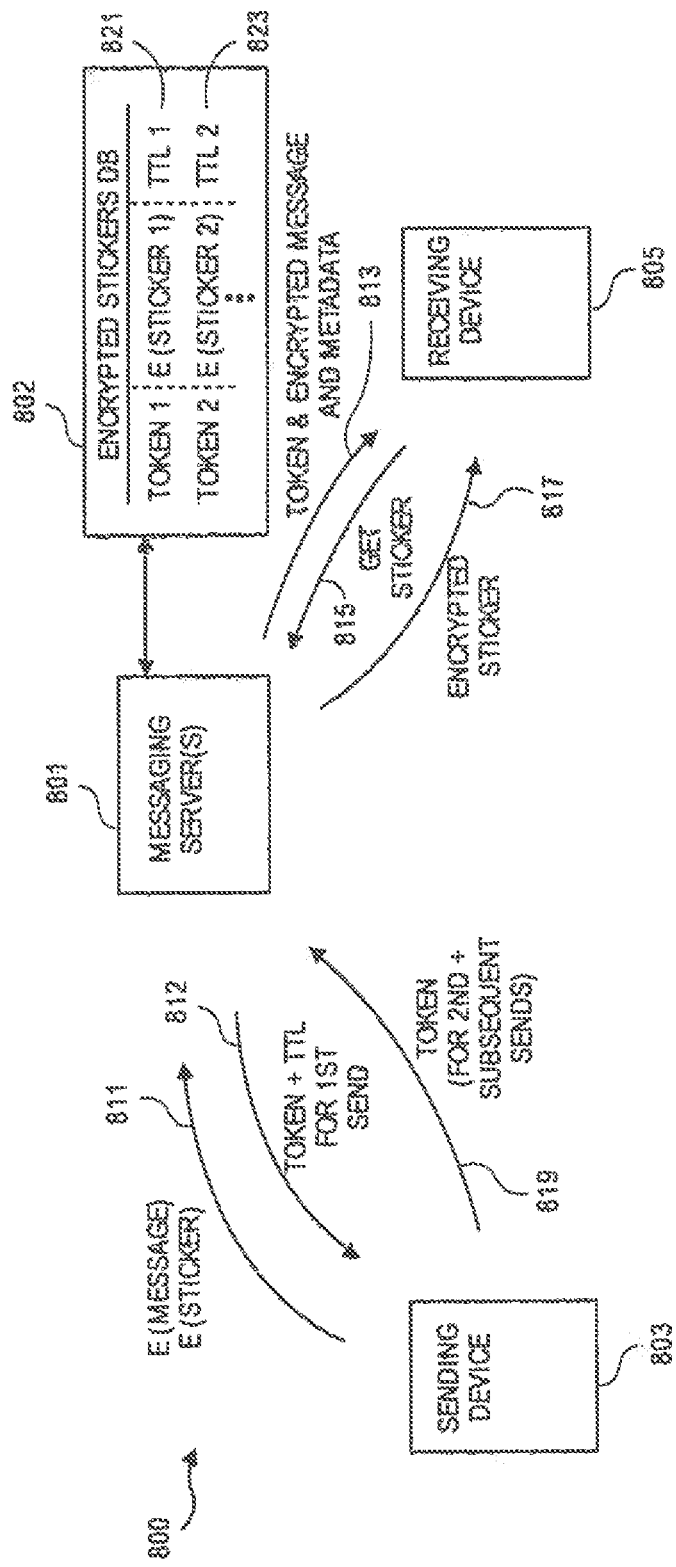
FIG. 15 shows an example according to one embodiment for providing a messaging system which uses sticker extension apps on both sending and receiving devices.
Figure 16A:
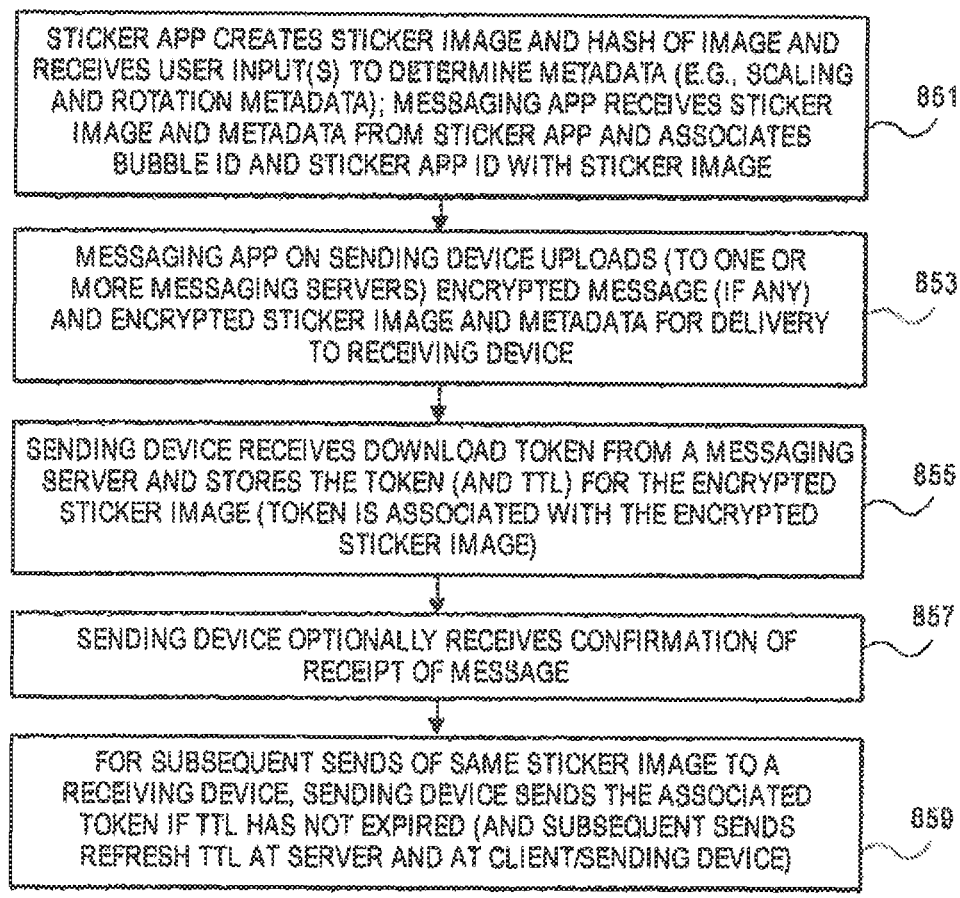
FIG. 16A is a flowchart which illustrates a method according to one embodiment which can be performed in the system shown in FIG. 15.

FIG. 16A shows a method according to one embodiment in which the sending device 803 interacts with the set of one or more messaging servers 801. In operation 851, the sticker extension app creates a sticker image and a hash of the image and can receive user inputs to determine image metadata, such as scale and rotation metadata. In one embodiment, the creation of the sticker image may involve merely selecting a particular sticker image, such as sticker image 841 from a browsable sticker view 835 shown in FIG. 16C, and dragging the selected sticker, such as sticker 841 onto a message, such as message bubble 839 (or any other message bubble in the message transcript or in the text staging area) which may have been sent by the communication device 831. Similarly, the creation of the flower sticker on the message bubble 839 may involve merely dragging the sticker 843 from the browsable sticker view 835 onto the message bubble 839 (or any other message bubble in the message transcript or in text staging area) and performing any image manipulations such as scaling or rotation while the flower is on the message bubble 839. Referring back to FIG. 16A, in operation 851, the messaging app receives the sticker image and the image metadata (e.g. rotation metadata and scale metadata) and position metadata for position on a specified message bubble from the sticker app and associates a bubble identifier (which can be identified as the specified message bubble) and a sticker extension app identifier with the sticker image. Then in operation 853, the messaging app on the sending device uploads, to one or more messaging servers, the encrypted message (if any) and the encrypted sticker image and metadata for delivery to the receiving device. This upload process is shown as send 811 in FIG. 15. Then in operation 855 the sending device (such as sending device 803) receives a download token from the one or more messaging servers 801 and stores the token and an associated TTL value for the corresponding encrypted sticker image. This is shown as receive 812 in FIG. 15. In operation 857 in FIG. 16A, the sending device can also optionally receive confirmation of receipt of the message. Then, in operation 859 for subsequent sends of the same image sticker to the same receiving device or other receiving devices (in one embodiment), the sending device 803 can send 819 the associated token for that sticker image for delivery to the same receiving device or other receiving devices (in one embodiment) as long as the TTL value has not expired. The sending of the token can in one embodiment refresh the TTL value both at the messaging server and at the sending device 803. Thus, the one or more messaging servers upon receiving the token for second and subsequent sends will refresh the corresponding time-to-live value within the database 802. On the other and, if the time-to-live value has expired then the sending device 803, it will upload another copy of the encrypted sticker image again and receive a new download token and a new time-to-live value from the one or more messaging servers 801.

Figure 16B:
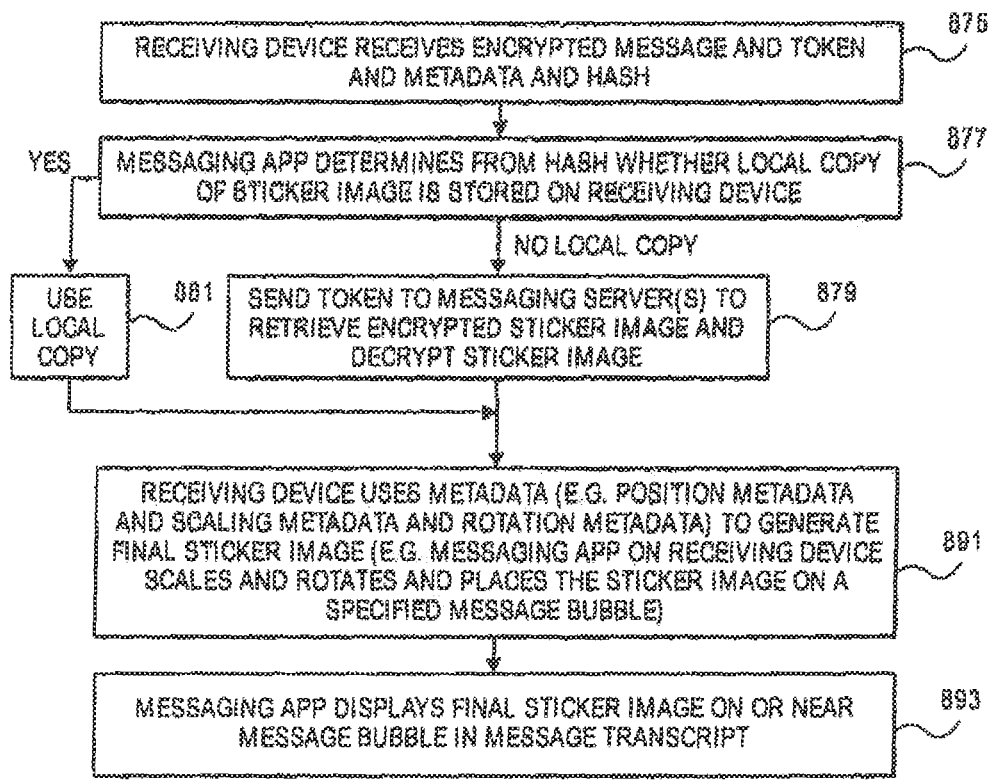
FIG. 16B is a flowchart which illustrates another method according to one embodiment which can be performed with the system shown in FIG. 15.
Figure 16C:
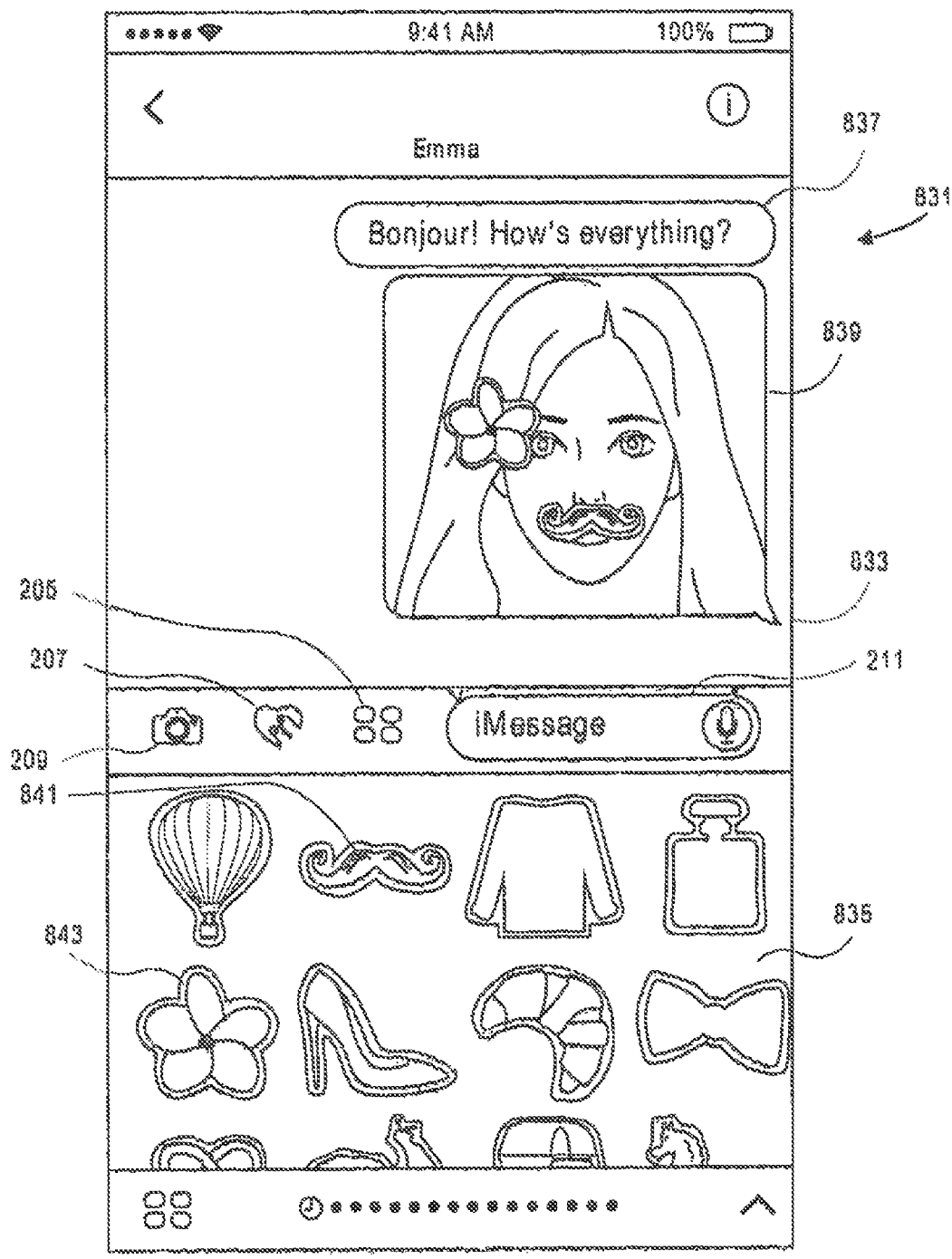
FIG. 16C shows a user interface according to one embodiment of a messaging app which hosts a view of a sticker extension app that has been used to create and apply stickers on a message in the message transcript of the messaging app.

The method shown in FIG. 16B can be performed by receiving device 805. In operation 875, the receiving device can receive an encrypted message and a download token and corresponding metadata, and this is shown as received 813 in FIG. 15. The metadata in one embodiment can include the hash created by the remote sticker extension app and the sticker extension app identifier and also a bubble identifier and position metadata to indicate a position on the identified message bubble and scaling metadata and rotation metadata for use by a messaging app on device 805 to position and scale and rotate the sticker. In operation 877, the messaging app determines from the hash received in operation 875 whether the receiving device has a local copy of the sticker image stored on the receiving device. If it does, then operation 881 follows operation 877, causing the processing to jump to operation 891 as shown in FIG. 16B. If no local copy exists then operation 879 follows operation 877, and the receiving device 805 sends, in operation 879, the download token in send 815 shown in FIG. 15 to the one or more messaging servers 801 to retrieve the encrypted sticker image, and then the messaging app decrypts the encrypted sticker image in operation 879. Then in operation 891 the receiving device uses the image metadata to generate the final sticker image which can include one or more rotations and enlargements or shrinking of the image (or other modifications of the image); in one embodiment, the messaging app on the receiving device performs operation 891. Then in operation 893 the messaging app can display the final sticker image on the bubble in the message transcript (on the bubble that was identified by the bubble identifier). FIG. 16C shows an example where the user has created two sticker images and placed them on the message bubble 839.

In one embodiment, a sticker extension app can provide a user interface that allows one or more users to assemble a sticker from parts or portions of stickers from a library of sticker components in order to create a final sticker that includes selected parts or portions from the library; the library can be provided by the sticker extension app. The sticker extension app can guide the creation of the final sticker through a "wizard" that directs the user through the phases involved in creating the final sticker. An example of such a sticker extension app is described in Appendix II of U.S. Provisional Patent Application No. 62/349,091, filed Jun. 12, 2016.

The example shown in FIG. 15 is one embodiment for distributing or sending stickers to receiving devices, and two alternative embodiments will now be described. In a first alternative embodiment, when a developer of a sticker extension app uploads the extension app and its resources and assets (such as the sticker images) to a distribution facility/service such as an on-line store for apps, the distribution facility/service can extract the assets and store them in a cloud based storage system (e.g. one or more servers that support iCloud storage) and provide a unique identifier (such as globally unique identifiers—GUID) for each of the sticker images and associate the GUID with the corresponding sticker image. The distribution facility/service can also store the unique identifiers with the sticker extension app (e.g. as part of a bundle that includes the sticker extension app) so that a sending device (e.g. device 803) can install the sticker extension app with the unique identifiers for the sticker images included with the app. When the sending device sends a message with a sticker created by the sticker extension app, the messaging app on the sending device sends the unique identifier for the sticker to the messaging app on the receiving device. The messaging app on the receiving device can then retrieve the sticker image (if not stored locally on the receiving device) by sending the unique identifier to the cloud based storage system which can respond by sending the identified sticker image to the receiving device.

The second alternative embodiment supports new stickers that can be generated by a user (who uses an image creation or capture app to generate a new sticker), and the second alternative embodiment also can use a cloud based storage service that uses an identifier of a sticker image (e.g., a hash of the sticker image) to retrieve the sticker image when a receiving device requests the sticker. When a sending device (e.g., sending device 803) sends a sticker, it can check its local storage for a list of stickers previously sent to the set of one or more messaging servers and if the sticker has previously been sent, the sending device sends an identifier of the sticker to the receiving device. The identifier can be a hash such as a SHA-1 hash or MD1 hash of the sticker image, and this identifier will be dependent on the content of the sticker image and be a reliable and unique identifier of the sticker image in virtually all situations. The receiving device can, after receiving the identifier from the sending device, use the identifier to retrieve the sticker from the cloud based storage service which uses, in one embodiment, the identifier as a key to look up the sticker image in a database, and then the cloud based storage service sends the retrieved sticker image to the receiving device. If the sending device determines, when it checks its local storage for previously sent stickers, that the sticker image has not been previously sent by the messaging app of the sending device then the messaging app can send the sticker image to the cloud based storage service (either directly or through the messaging server(s) which can create the hash (identifier) of the sticker image and store both in the cloud based storage service; the sending device can also send the identifier (e.g. hash of sticker image) to the receiving device which can use the identifier to retrieve the sticker image from the cloud based storage service.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 17:
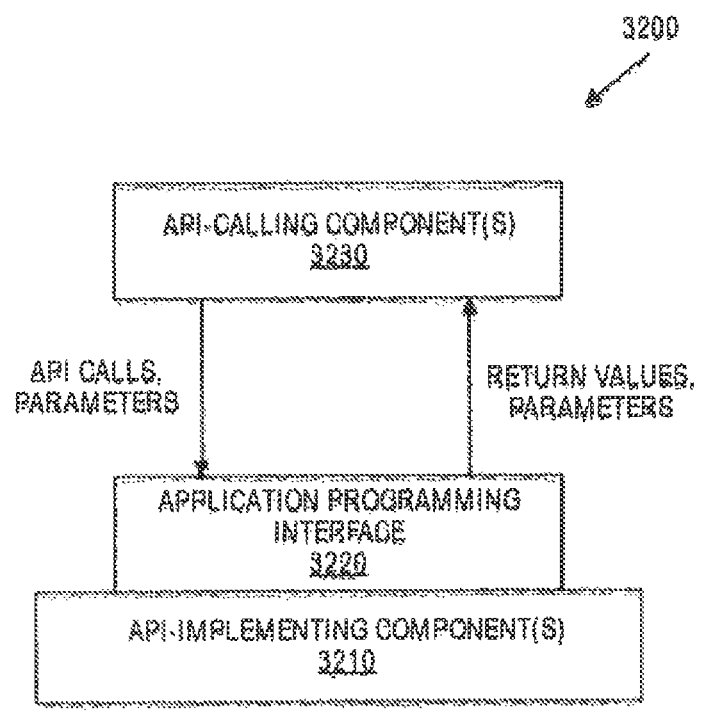
FIG. 17 is a block diagram illustrating an exemplary API architecture, which may be used in one or more of the embodiments described herein.

FIG. 17 is a block diagram illustrating an exemplary API architecture, which may be used in one embodiment of the present invention. As shown in FIG. 17, the API architecture 3200 includes the API-implementing component 3210 (e.g., an operating system, a library, a device driver, an API, an application program, software or other module) that implements the API 3220. The API 3220 specifies one or more functions, methods, classes, objects, protocols, data structures, formats and/or other features of the API-implementing component that may be used by the API-calling component 3230. The API 3220 can specify at least one calling convention that specifies how a function in the API-implementing component receives parameters from the API-calling component and how the function returns a result to the API-calling component. The API-calling component 3230 (e.g., an operating system, a library, a device driver, an API, an application program, software or other module) makes API calls through the API 3220 to access and use the features of the API-implementing component 3210 that are specified by the API 3220. The API-implementing component 3210 may return a value through the API 3220 to the API-calling component 3230 in response to an API call.

It will be appreciated that the API-implementing component 3210 may include additional functions, methods, classes, data structures, and/or other features that are not specified through the API 3220 and are not available to the API-calling component 3230. It should be understood that the API-calling component 3230 may be on the same system as the API-implementing component 3210 or may be located remotely and accesses the API-implementing component 3210 using the API 3220 over a network. While FIG. 32 illustrates a single API-calling component 3230 interacting with the API 3220, it should be understood that other API-calling components, which may be written in different languages (or the same language) than the API-calling component 3230, may use the API 3220.

The API-implementing component 3210, the API 3220, and the API-calling component 3230 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 18:
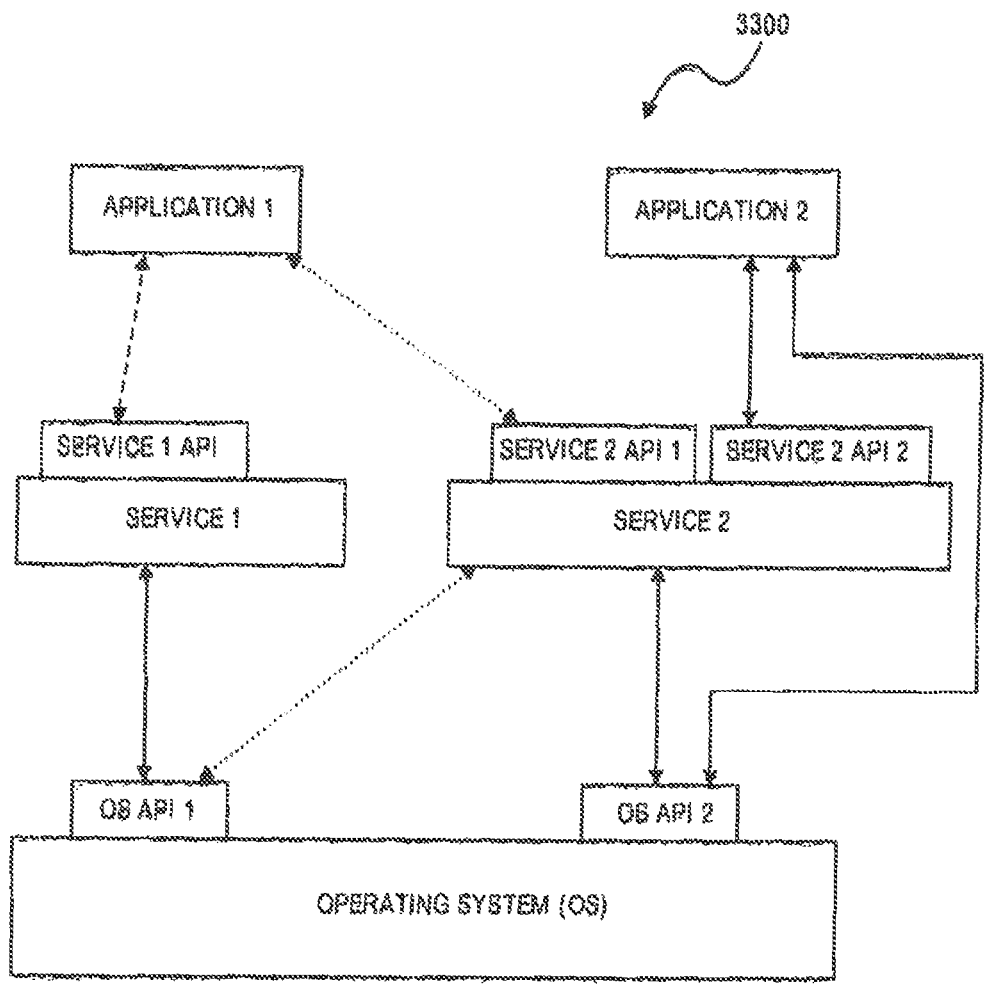
FIG. 18 shows a block diagram illustrating a software stack which can include one or more applications and services in operating systems.

In FIG. 18 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 19:
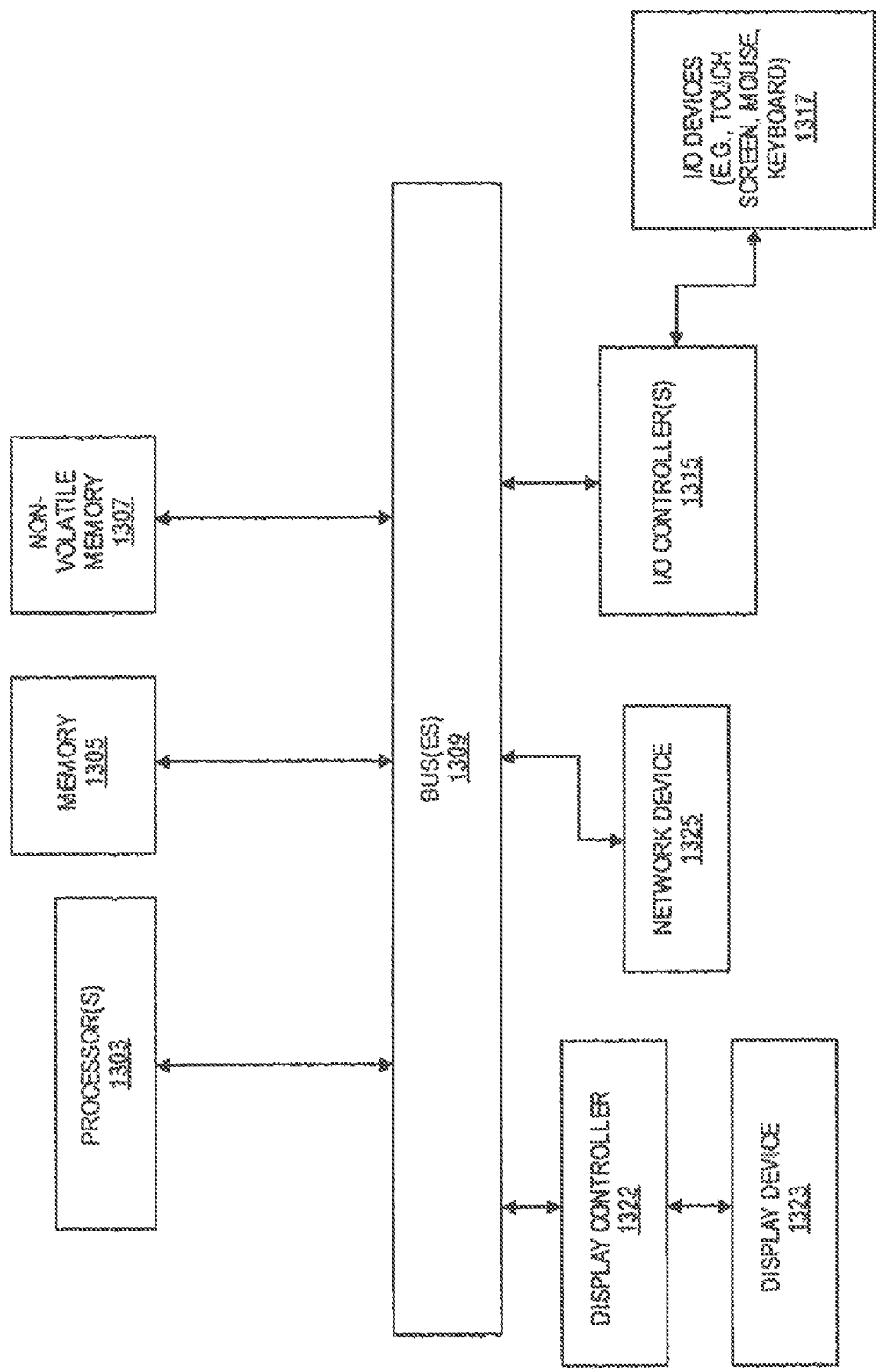
FIG. 19 shows an example of a data processing system which can be used in one or more embodiments described herein.

FIG. 19 is a block diagram of data processing system hardware according to an embodiment. Note that while FIG. 19 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 19 can also be used with the present invention.

As shown in FIG. 19, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 19 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

The present disclosure recognizes that the use of personal information data, in the present technology, can be used to the benefit of users. For example, the personal information data can be used to deliver information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:

receiving a selection, to create a sticker image, within a user interface view of a sticker application (app) hosted by a messaging app; receiving one or more user inputs which specify changes to the selected sticker image, the one or more user inputs defining image metadata; communicating the sticker image and the image metadata to a first messaging app through an interprocess communication between the sticker app and the first messaging app, the sticker app being an extension app configured to be executed by the first messaging app and the sticker app being unexecutable by applications outside of the first messaging app; uploading, by the first messaging app, the sticker image, a message and the image metadata to one or more messaging servers for delivery of the message and the sticker image and the image metadata to a receiving device; receiving and storing by the first messaging app, a token from the one or more messaging servers, the token representing the sticker image; sending, by the first messaging app in response to a subsequent request to send the sticker image, the token to the one or more messaging servers without sending the sticker image again.

2. The medium as in claim 1, the method further comprising:
   displaying, by the sticker application in a view hosted by the first messaging app, a set of sticker images, each selectable by a user to associate with a message in a message bubble in a message transcript view of the first messaging app.

3. The medium as in claim 2, wherein the user associates a sticker image with a message bubble by dragging the sticker image onto the message bubble.

4. The medium as in claim 1 wherein the image metadata comprises one or more of: (a) scaling data to vary a size of the sticker image; (b) rotation data to vary a rotation data of the sticker image; (c) location of the sticker image on the message in a message bubble; or (d) other image modification data.

5. The medium as in claim 4 wherein an amount of data of the sticker image is constrained to remain below a predetermined limit.

6. The medium as in claim 5 wherein the first messaging app displays the sticker image on the message in a message transcript within a view of the first messaging app, wherein a size and rotation and location of the sticker image on the message is specified by the image metadata, and wherein the first messaging app encrypts the sticker image for each receiving device to generate multiple encrypted sticker images when the message is sent to multiple receiving devices.

7. The medium as in claim 1 wherein the first messaging app encrypts the sticker image for each receiving device to generate multiple encrypted sticker images when the message is sent to multiple receiving devices.

8. The medium as in claim 1, the method further comprising:
   receiving a time-to-live (TTL) value of the token from the one or more messaging servers, the TTL value being refreshed at the first messaging app and at the one or more servers in response to the subsequent request to send the sticker image.

9. The medium as in claim 1, the method further comprising:
   determining, by the first messaging app from data about a receiving device, that a second messaging app on the receiving device Is not compatible with the sticker app;
   sending, by the first messaging app, alternative content to the receiving device in response to determining the second messaging app is not compatible with the sticker app.

10. A method comprising:
    receiving, by a first messaging application (app) on a first device, a message and a token and associated metadata, which comprises image metadata, from a second device, the token referring to a sticker image created by a second sticker extension app configured to be executed on the second device only by a second messaging app on the second device, the first and the second messaging apps are each configured to transmit Short Message Service (SMS) text messages and other content and display the text messages in a message transcript;
    sending, by the first messaging app, the token to one or more messaging servers to obtain the sticker image;
    receiving, by the first messaging app, the sticker image in response to sending the token and generating a final image by applying the image metadata to the sticker image;
    displaying, by the first messaging app, the final image on or near a message bubble containing the message.

11. The method of claim 10, further comprising:
    communicating, by the first messaging app, the sticker image and image metadata to a first sticker extension app identified by an app identifier contained in the associated metadata, the sticker image and the image metadata being communicated from the first messaging app to the first sticker extension app through an inter-process communication (IPC);
    generating, by the first sticker extension app, the final image by applying the image metadata to the sticker image;
    communicating the final image from the first sticker extension app to the first messaging app through an IPC;
    and wherein the first messaging app executes in a first process and the first sticker extension app executes in a second process that is distinct from the first process, and wherein the message bubble is identified by a bubble identifier.

12. The method of claim 11, wherein the first messaging app receives the sticker image in an encrypted form and decrypts the sticker image and provides the decrypted form of the sticker image to the first sticker extension app through an IPC.

13. The method of claim 10, wherein an amount of data of the sticker image is constrained to remain below a predetermined limit.

14. The method of claim 10, wherein the image metadata comprises one or more of: (a) scaling data to vary a size of the sticker image; (b) rotation data to vary a rotation of the sticker image, or (c) other image modification data.

15. The method of claim 14, wherein the first messaging app displays the message bubble in a message transcript within a view of the first messaging app, and wherein a size and rotation of the final image on or near the message bubble is specified by the image metadata.

16. The method of claim 10, wherein the first messaging app uses a hash of the sticker image to determine whether the first messaging app already has a copy of the sticker image before sending the token, and wherein the hash is contained in either the associated metadata or the image metadata.

17. The method of claim 10, further comprising:
    launching a first sticker extension app automatically in response to receiving the message, wherein the launching occurs without user action or intervention.

18. A device comprising:
    a memory; and at least one processor
    configured to:
      receive a plurality of encrypted sticker images for delivery to a plurality of recipients from a first messaging app, each of the plurality of encrypted sticker images representing the same sticker image when decrypted;
      create and transmit a plurality of tokens to the first messaging app, each of the plurality of tokens assigned for one of the plurality of recipients;
      create a time-to-live (TTL) value for each of the encrypted sticker images and transmitting at least one of the TTL values to the first messaging app;

store the plurality of encrypted sticker images and the plurality of tokens and the TTL values;

receive, from the first messaging app, one of the tokens in the plurality of tokens in response to the first messaging app sending the same sticker image to a second messaging app on a receiving device corresponding to one of the recipients in the plurality of recipients and refreshing the TTL value corresponding to the received token;

and receive, from the first messaging app, metadata associated with the same sticker image and transmit, to the second messaging app, the metadata, the metadata being at least one of: (a) a sticker extension app identifier provided by a service from which extension apps can be downloaded, or (b) image metadata used by a sticker extension app that is configured to be executed by the second messaging app to create a modified sticker image, wherein the sticker extension app is not executable on the device outside of the second messaging app.

19. The device of claim 18, wherein the at least one processor is further configured to:

send, the second messaging app on the receiving device, an encrypted sticker image in response to the second messaging app sending one of the tokens in the plurality of tokens, the sent token corresponding to the sent encrypted sticker image.

20. The device of claim 19, wherein the device is part of a set of one or more messaging servers, wherein the one or more messaging servers also receive a plurality of encrypted messages, one for each of the plurality of recipients, and wherein the one or more messaging servers store the plurality of encrypted sticker images, the plurality of tokens and the TTL values in a set of one or more databases.

* * * * *